United States Patent
Kessler

(10) Patent No.: US 10,856,199 B2
(45) Date of Patent: Dec. 1, 2020

(54) COMMUNICATION SYSTEMS WITH AUXILIARY MASTER AND AUXILIARY CALL SUPPORT FUNCTIONALITY

(71) Applicant: Analog Devices, Inc., Norwood, MA (US)

(72) Inventor: Martin Kessler, Salem, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 42 days.

(21) Appl. No.: 16/239,798

(22) Filed: Jan. 4, 2019

(65) Prior Publication Data

US 2020/0221362 A1 Jul. 9, 2020

(51) Int. Cl.
| | |
|---|---|
| *H04W 36/30* | (2009.01) |
| *H04W 36/08* | (2009.01) |
| *H04W 4/90* | (2018.01) |
| *H04W 84/20* | (2009.01) |

(52) U.S. Cl.
CPC ........... *H04W 36/305* (2018.08); *H04W 4/90* (2018.02); *H04W 36/08* (2013.01); *H04W 84/20* (2013.01)

(58) Field of Classification Search
CPC ................ H04W 84/20; G05F 13/4247; G05F 13/4282; H04L 12/40019
See application file for complete search history.

(56) References Cited

U.S. PATENT DOCUMENTS

| | | | |
|---|---|---|---|
| 5,819,051 A | 10/1998 | Murray et al. | |
| 7,158,596 B2 | 1/2007 | Knapp et al. | |
| 7,272,202 B2 | 9/2007 | Knapp et al. | |
| 7,315,551 B2 | 1/2008 | Olson et al. | |
| 7,395,362 B2 | 7/2008 | Drexler et al. | |
| 7,539,804 B2 | 5/2009 | Miura | |
| 7,685,449 B2 | 3/2010 | Terasawa | |
| 7,707,437 B2 | 4/2010 | Berenbaum et al. | |
| 7,802,036 B2 | 9/2010 | Takeuchi | |
| 7,966,379 B2 | 6/2011 | Berenbaum et al. | |
| 8,147,338 B2 | 4/2012 | Hutchison-Kay | |
| 8,156,274 B2 | 4/2012 | Kapelner | |
| 8,185,759 B1 | 5/2012 | Li et al. | |
| 8,600,583 B2 | 12/2013 | Fervel et al. | |
| 8,615,091 B2 | 12/2013 | Terwal | |
| 8,667,194 B2 | 3/2014 | Dybsetter et al. | |
| 8,745,305 B2 | 6/2014 | Toba et al. | |
| 8,806,083 B2 | 8/2014 | Doorenbos | |
| 8,873,659 B2 | 10/2014 | Wang et al. | |
| 8,987,933 B2 | 3/2015 | Yu | |

(Continued)

OTHER PUBLICATIONS

Unpublished U.S. Appl. No. 15/943,341, filed Apr. 2, 2018.

(Continued)

*Primary Examiner* — Walli Z Butt
*Assistant Examiner* — Ryan C Kavleski
(74) *Attorney, Agent, or Firm* — Patent Capital Group

(57) ABSTRACT

Disclosed herein are systems and techniques for auxiliary master and/or auxiliary call support functionality. For example, in some embodiments, a communication system with auxiliary master functionality may include a master node coupled to a plurality of downstream slave nodes, wherein at least one of the slave nodes may perform master node functions when the master node is disconnected from the system.

20 Claims, 25 Drawing Sheets

(56) References Cited

U.S. PATENT DOCUMENTS

| | | | |
|---|---|---|---|
| 2009/0021955 A1* | 1/2009 | Kuang | H05B 45/10 362/479 |
| 2012/0093342 A1 | 4/2012 | Rupprecht et al. | |
| 2013/0124763 A1 | 5/2013 | Kessler | |
| 2014/0025999 A1 | 1/2014 | Kessler | |
| 2014/0095750 A1 | 4/2014 | Tailliet | |
| 2014/0101351 A1 | 4/2014 | Hooper et al. | |
| 2014/0101477 A1 | 4/2014 | Patterson | |
| 2014/0223054 A1 | 8/2014 | Hasan et al. | |
| 2014/0281077 A1 | 9/2014 | Biskup | |
| 2014/0281078 A1 | 9/2014 | Biskup | |
| 2014/0281079 A1 | 9/2014 | Biskup | |
| 2014/0362865 A1 | 12/2014 | Chini et al. | |
| 2015/0008960 A1 | 1/2015 | Lahr | |
| 2015/0009050 A1 | 1/2015 | Lahr et al. | |
| 2015/0032599 A1 | 1/2015 | Agapitov | |
| 2015/0301968 A1 | 10/2015 | Kessler | |
| 2015/0365754 A1 | 12/2015 | Perl | |
| 2016/0034416 A1 | 2/2016 | Chavez et al. | |
| 2016/0034417 A1* | 2/2016 | Chavez | H04B 3/548 710/110 |
| 2016/0041941 A1 | 2/2016 | Kessler et al. | |
| 2016/0196817 A1 | 7/2016 | Mortensen et al. | |
| 2017/0220502 A1 | 8/2017 | Kessler et al. | |
| 2017/0222790 A1 | 8/2017 | Hooper et al. | |
| 2017/0222829 A1 | 8/2017 | Kessler | |
| 2017/0308352 A1 | 10/2017 | Kessler | |
| 2018/0060269 A1 | 3/2018 | Kessler | |
| 2019/0155781 A1* | 5/2019 | Amarilio | G06F 13/364 |

OTHER PUBLICATIONS

Unpublished U.S. Appl. No. 16/215,566, filed Dec. 10, 2018.
Cypress Perform, *I2C Master/Multi-Master/Slave 3.0*, Cypress Semiconductor Corporation, Nov. 2, 2011, 47 pages.
Peter James Miller, *Challenges and Solutions for Multi-Master/Multi-Slave PMBus Systems*, System Management Interface Forum, Texas Instruments, APEC Mar. 28, 2017, 10 pages.
Silicon Labs, AN141, *SMBus Communication for Small Form Factor Device Families*, Rev. 1.3 7/13, © 2013 Silicon Laboratories, 55 pages.

* cited by examiner

COMMUNICATION SYSTEMS WITH AUXILIARY MASTER AND AUXILIARY CALL SUPPORT FUNCTIONALITY

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Disclosed herein are systems and techniques for auxiliary master functionality. In some embodiments, a communication system with auxiliary master functionality may include a master node coupled to a plurality of downstream slave nodes, wherein at least one of the slave nodes may perform master node functions when the master node is disconnected from the system.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

Figure 1:
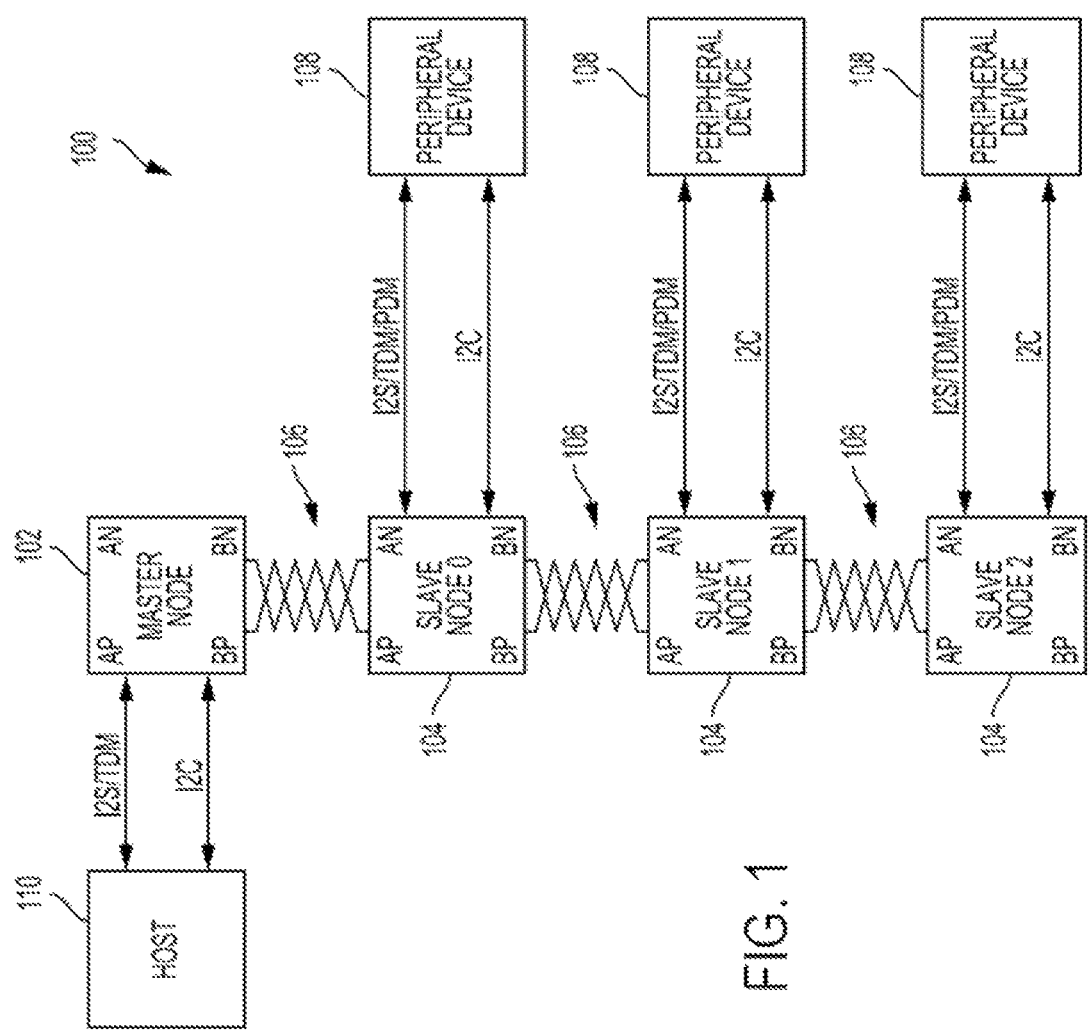
FIG. 1 is a block diagram of an illustrative two-wire communication system, in accordance with various embodiments.

FIG. 1 is a block diagram of an illustrative half-duplex two-wire communication system 100, in accordance with various embodiments. The system 100 includes a host 110, a master node 102 and at least one slave node 104. In FIG. 1, three slave nodes (0, 1, and 2) are illustrated. The depiction of three slave nodes 104 in FIG. 1 is simply illustrative, and the system 100 may include one, two, or more slave nodes 104, as desired.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. In some embodiments, the links of the bus 106 may each be formed of a single twisted wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines need be used.

The host 110 may include a processor that programs the master node 102, and acts as the originator and recipient of various payloads transmitted along the bus 106. In some embodiments, the host 110 may be or may include a microcontroller, for example. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a same housing as the host 110. The master node 102 may be programmable by the host 110 over the I2C bus for configuration and read-back, and may be configured to generate clock, synchronization, and framing for all of the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the devices 108. In embodiments in which the system 100 is included in a vehicle, the host 110 and/or the master node 102 may be included in a head unit of the vehicle.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for Inter-Integrated Circuit Sound (I2S) communication; the peripheral device 108 may communicate with the associated slave node 104 via the I2S protocol. In some embodiments, the peripheral device 108 may include any device configured for Inter-Integrated Circuit (I2C) communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
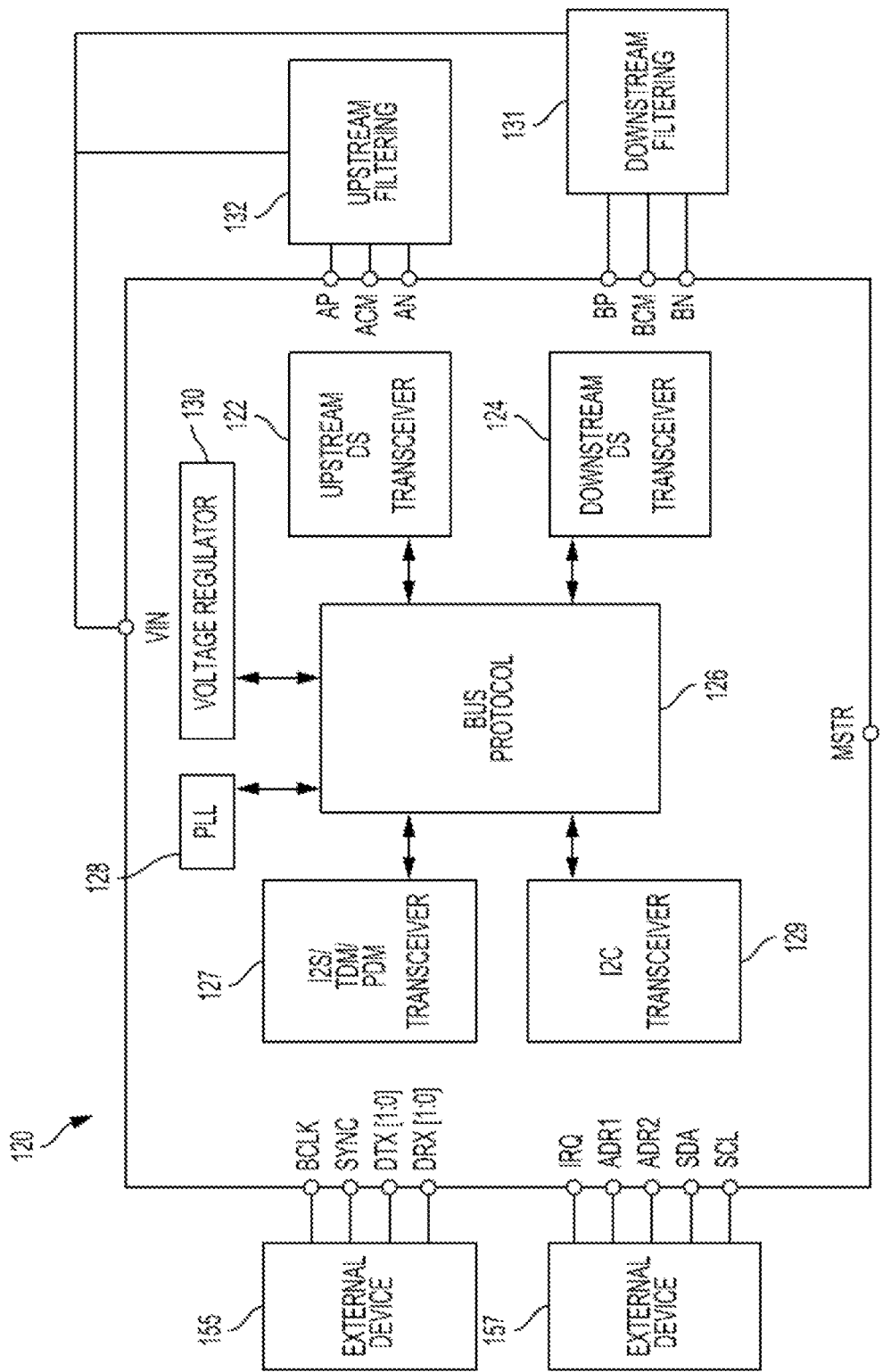
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 in order to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106). In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream bus interface circuitry 132 may be disposed between the upstream DS transceiver 122 and the voltage regulator circuitry 130, and downstream bus interface circuitry 131 may be disposed between the downstream DS transceiver 124 and the voltage regulator circuitry 130. Since each link of the bus 106 may carry AC (signal) and DC (power) components, the upstream bus interface circuitry 132 and the downstream bus interface circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream bus interface circuitry 132 and the downstream bus interface circuitry 131 may include a ferrite, a common mode choke, or an inductor, for example, to reduce the AC component provided to the voltage regulator circuitry 130. In some embodiments, the upstream bus interface circuitry 132 may be included in the upstream DS transceiver 122, and/or the downstream bus interface circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability. The node transceiver 120 may include other pins in addition to those shown in FIG. 2 (e.g., as discussed below).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the Pas of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

Figure 3:
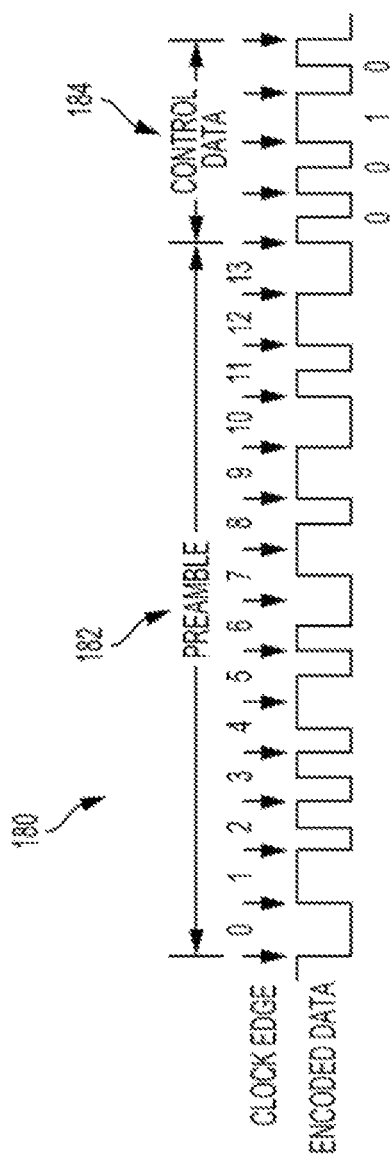
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
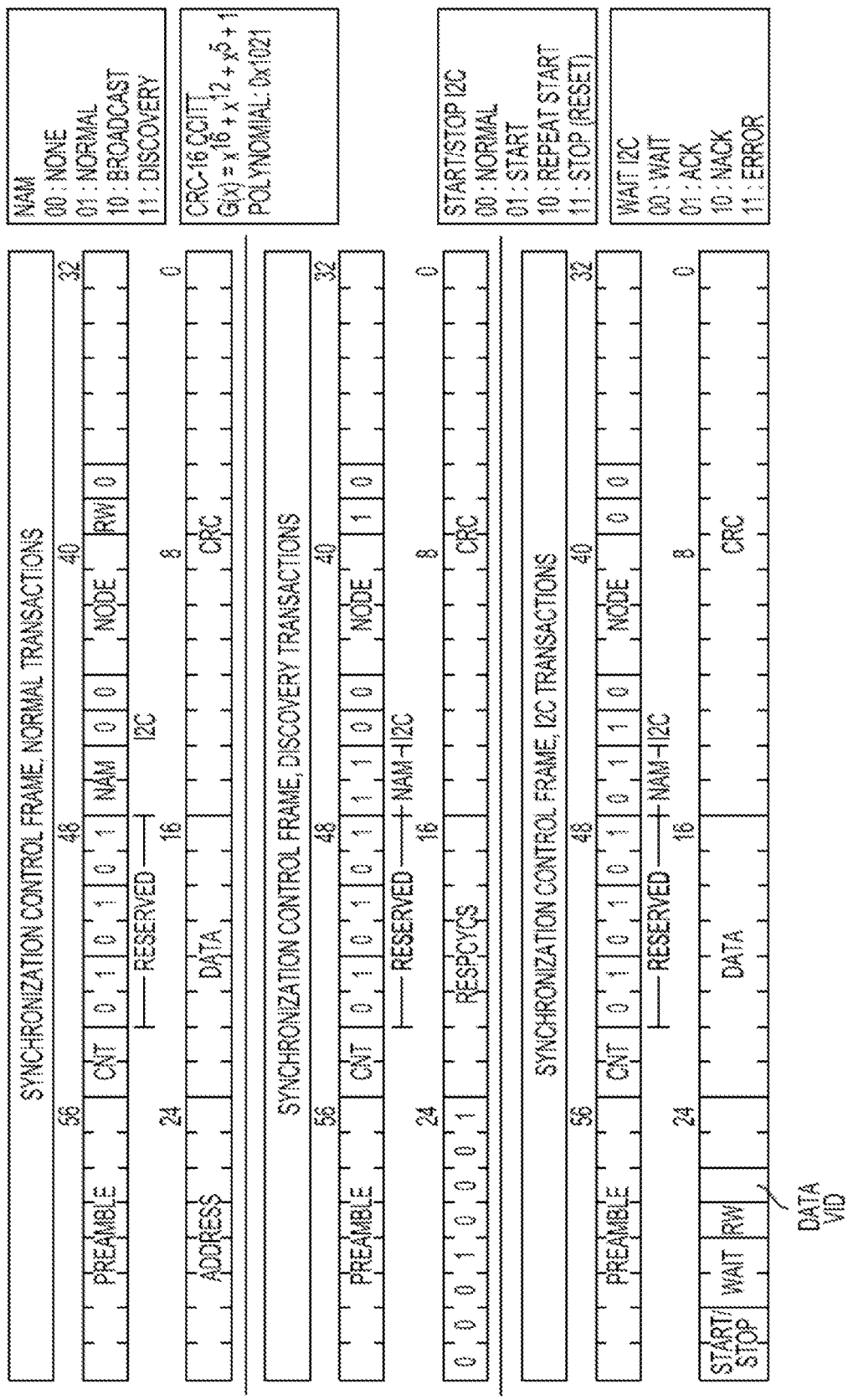
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 4:
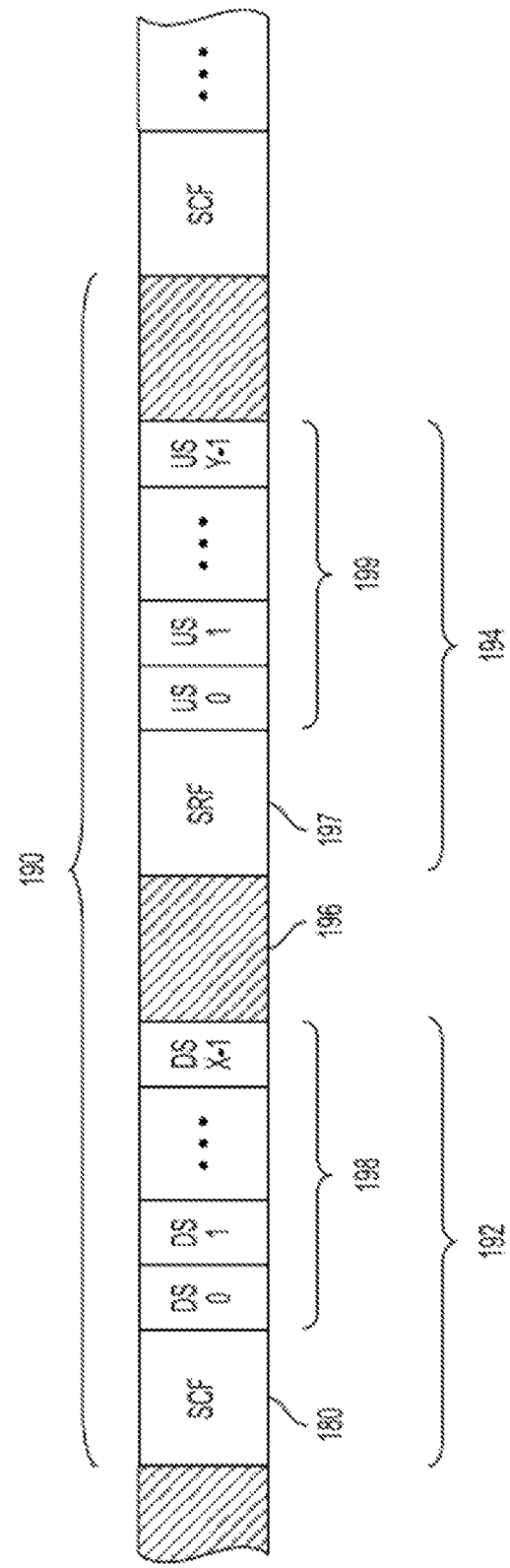
FIG. 4 is a diagram of a superframe used for communication in the system of FIG. 1, in accordance with various embodiments.
Figure 6:
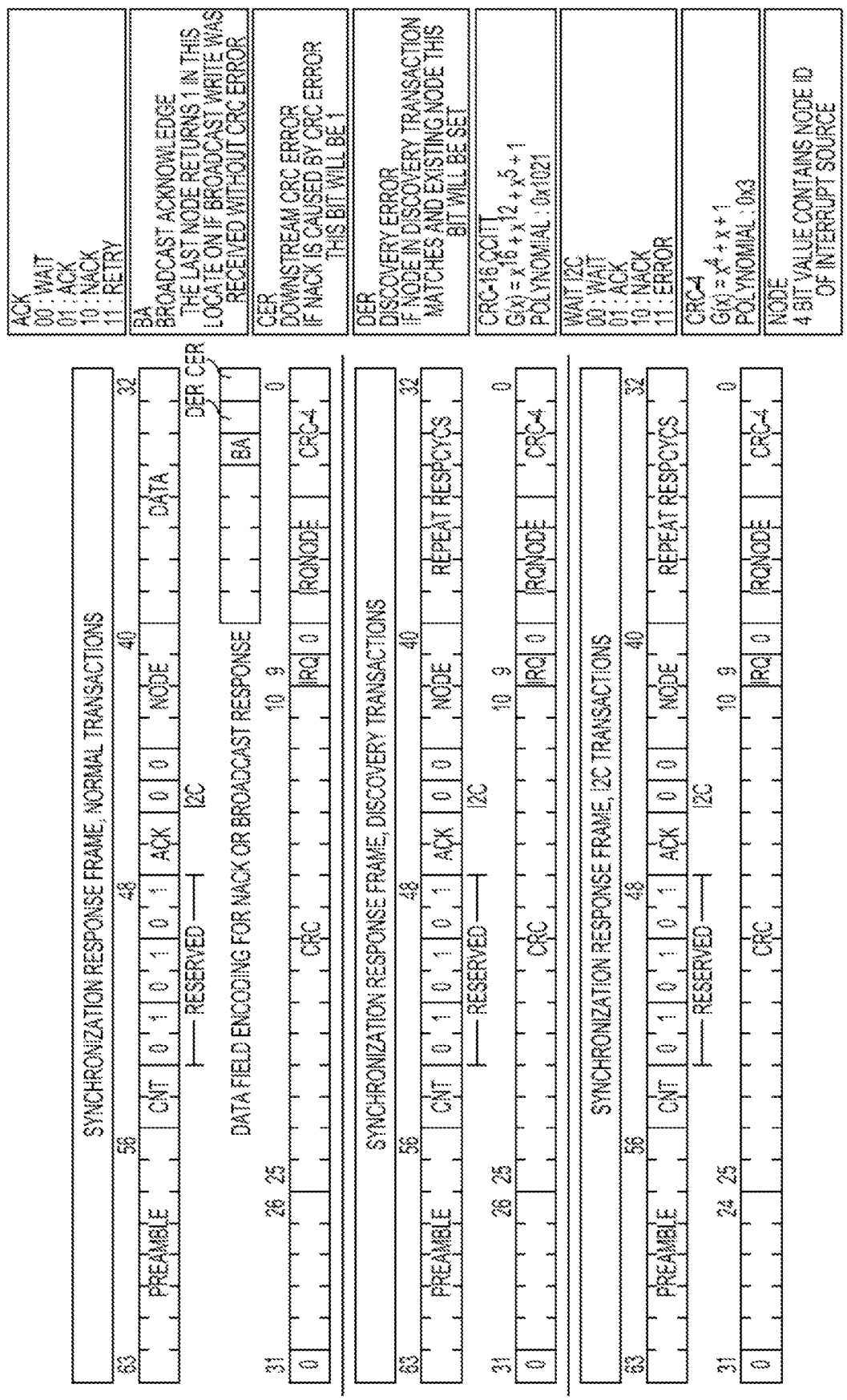
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 180 will match it. Additionally or alternatively, the remainder of the synchronization response frame may be structured so that the synchronization sequence cannot occur, such as by placing fixed "0" or "1" values at appropriate bits.

Figure 7:
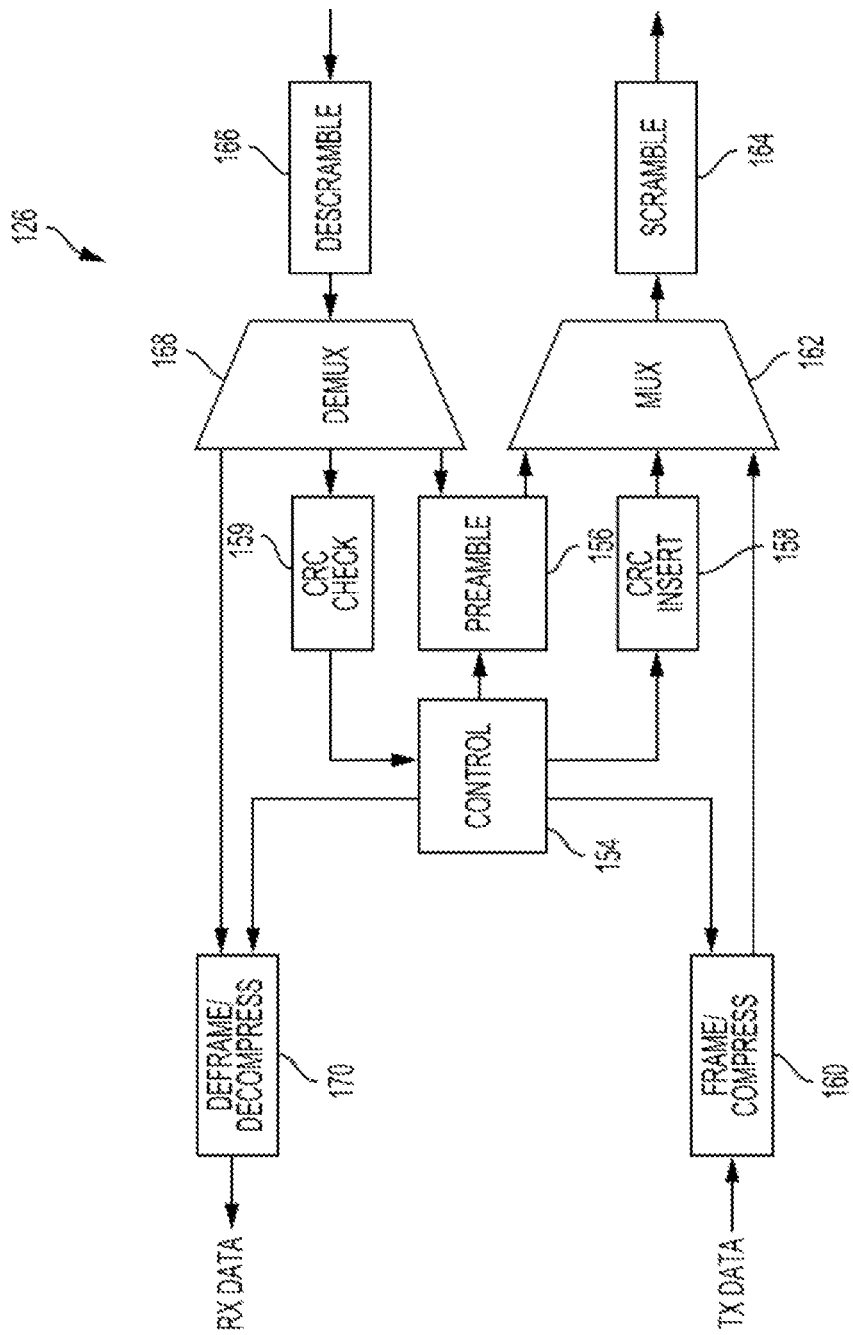
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream bus link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
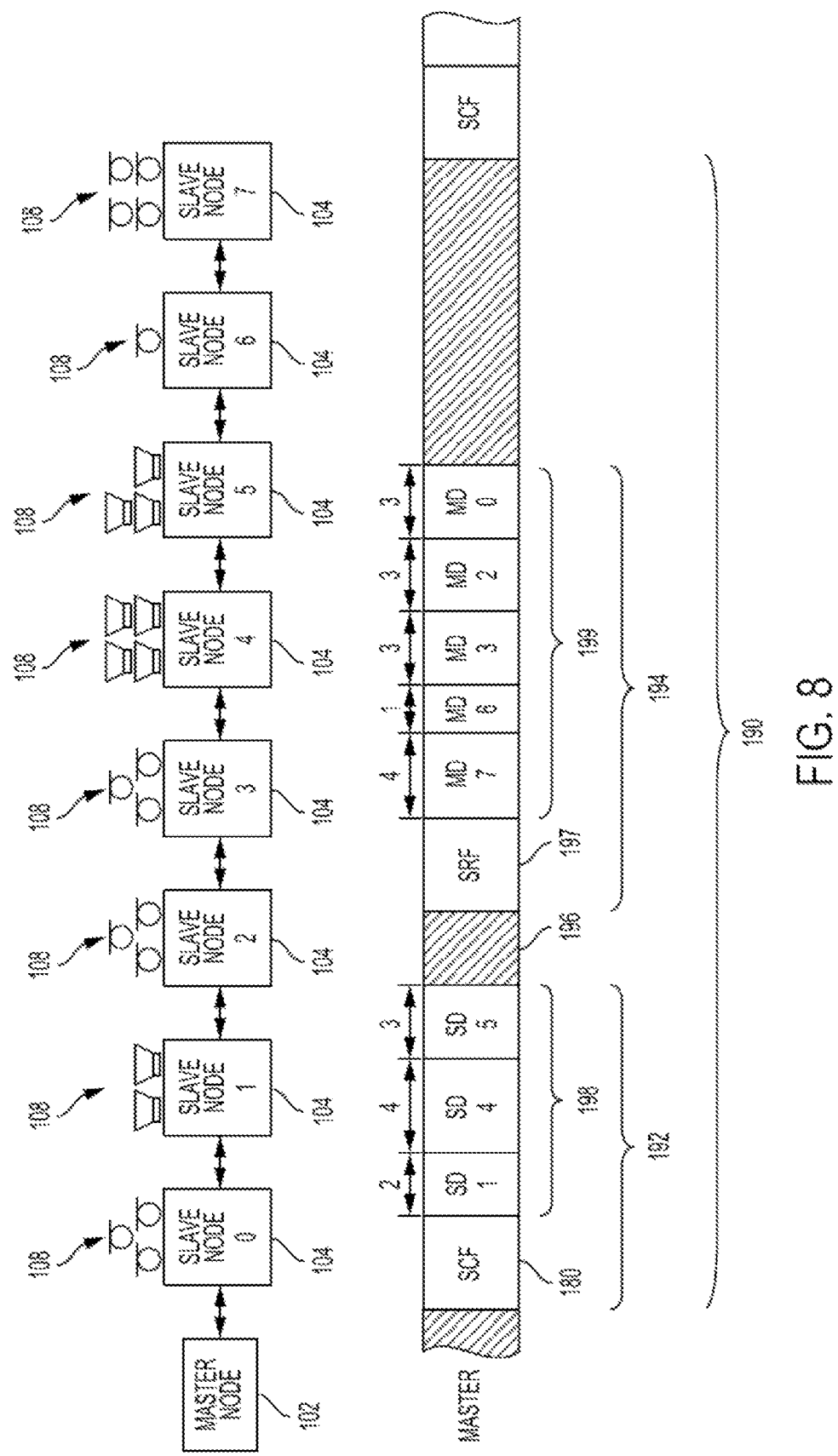
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the SCF and also forwards at least any data destined for downstream slave nodes 104. A particular slave node 104 may forward all data or may remove data destined for that slave node 104. When the last slave node 104 receives the SCF, that slave node 104 transmits the synchronization response frame (SRF) optionally followed by any data that the slave node 104 is permitted to transmit. Each successive slave node 104 forwards the SRF along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
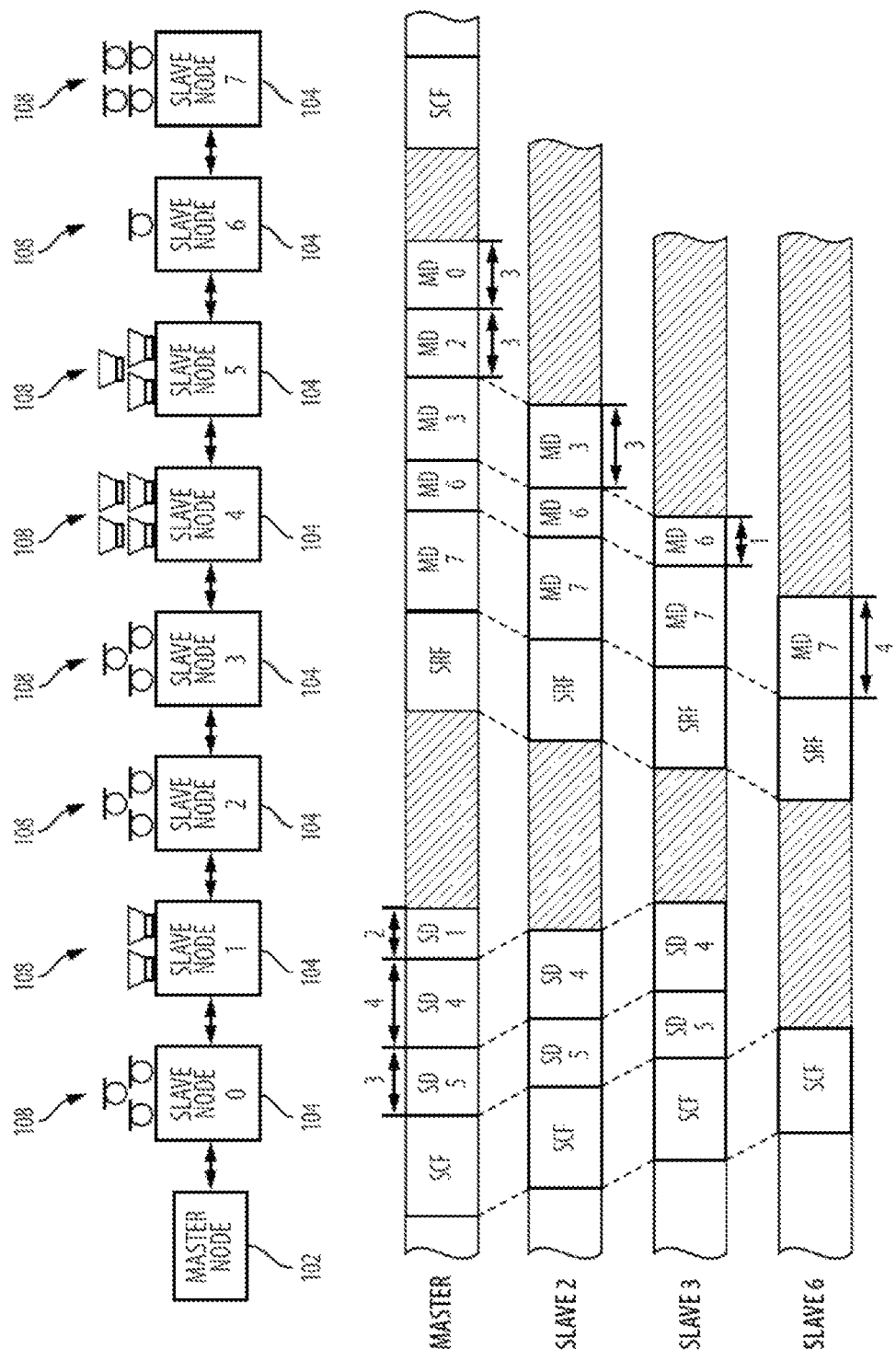

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102 transmits a SCF followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the SCF followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the SCF followed by the data for slave node 5, and, similarly, slave node 5 removes its own data and forwards to slave node 6 only the SCF. Slave node 6 forwards the SCF to slave node 7 (see the row labeled SLAVE 6).

At this point, slave node 7 transmits to slave node 6 the SRF followed by its data (see the row labeled SLAVE 6). Slave node 6 forwards to slave node 5 the SRF along with the data from slave node 7 and its own data, and slave node 5 in turn forwards to slave node 4 the SRF along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the SRF followed by the data from slave nodes 7, 6, 3, 2, and 0 (see the row labeled MASTER).

Figure 10:
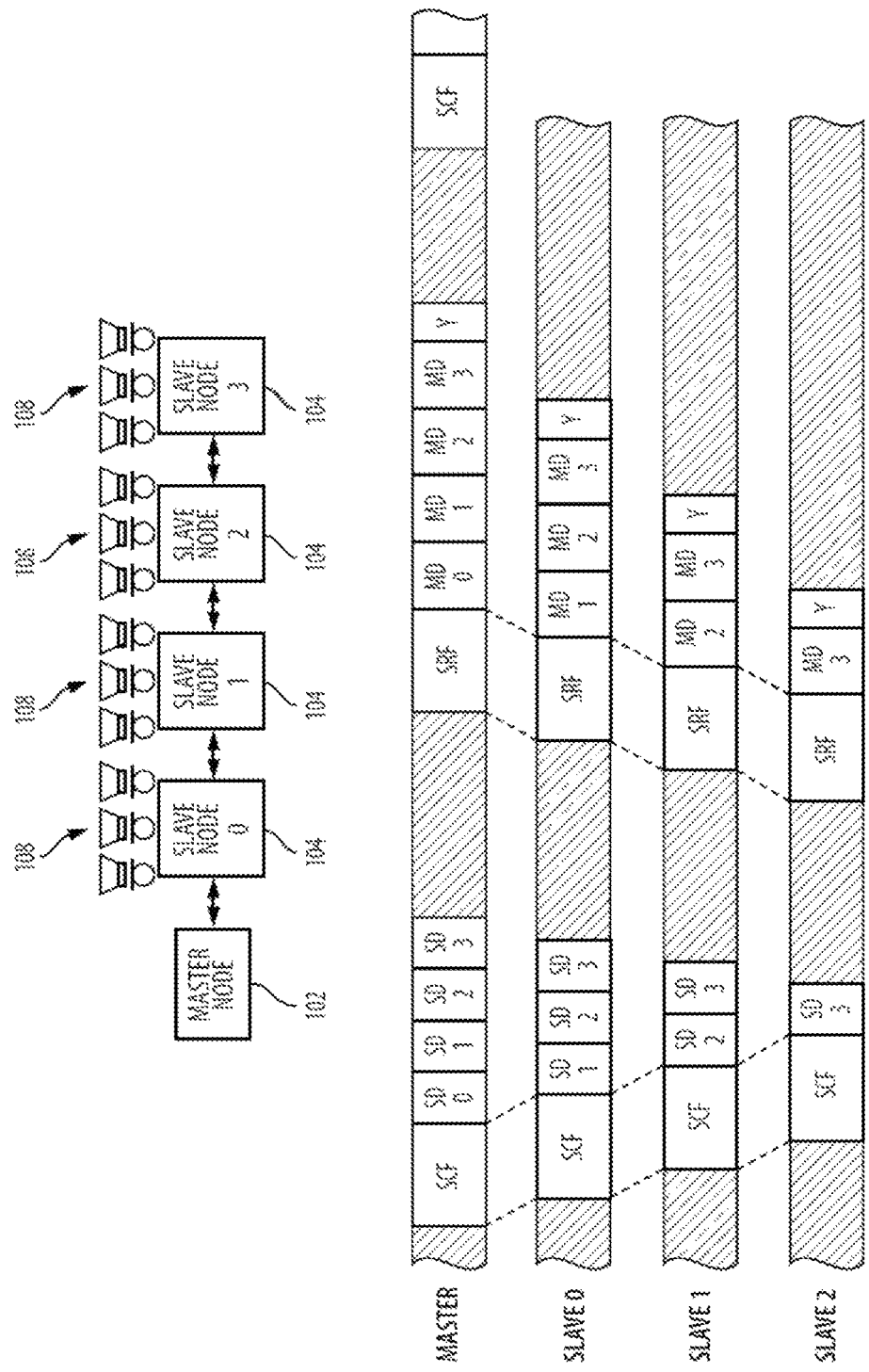

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 104 are coupled with both sensors and actuators as the peripheral device 108 such that the master node 102 sends data downstream to all of the slave nodes 104 and receives data back from all of the slave nodes 104. Also, in FIG. 10, the data is ordered based on the node address to which it is destined or from which it originates. The data slot labeled "Y" may be used for a data integrity check or data correction.

Figure 11:
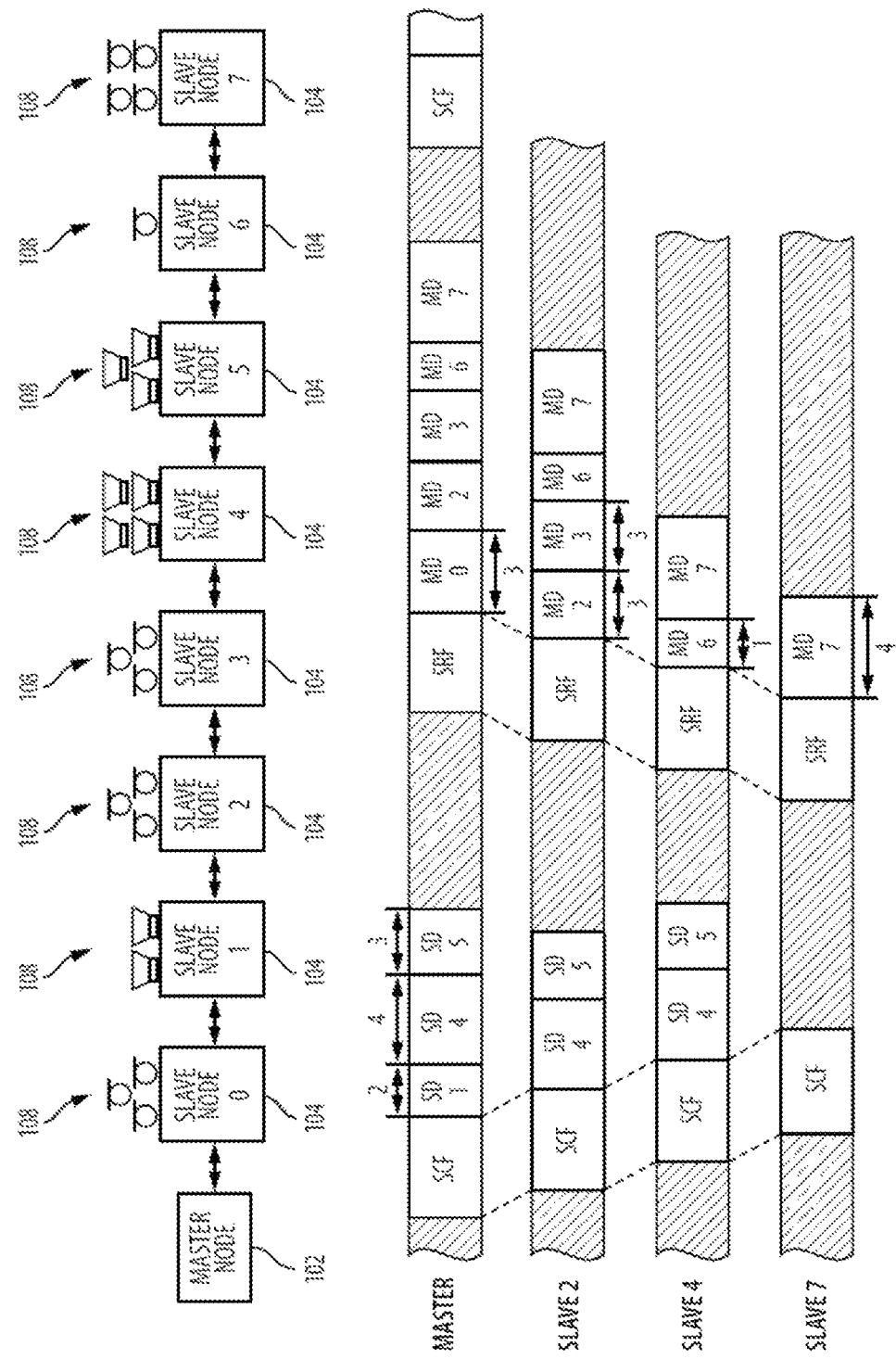

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all of the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
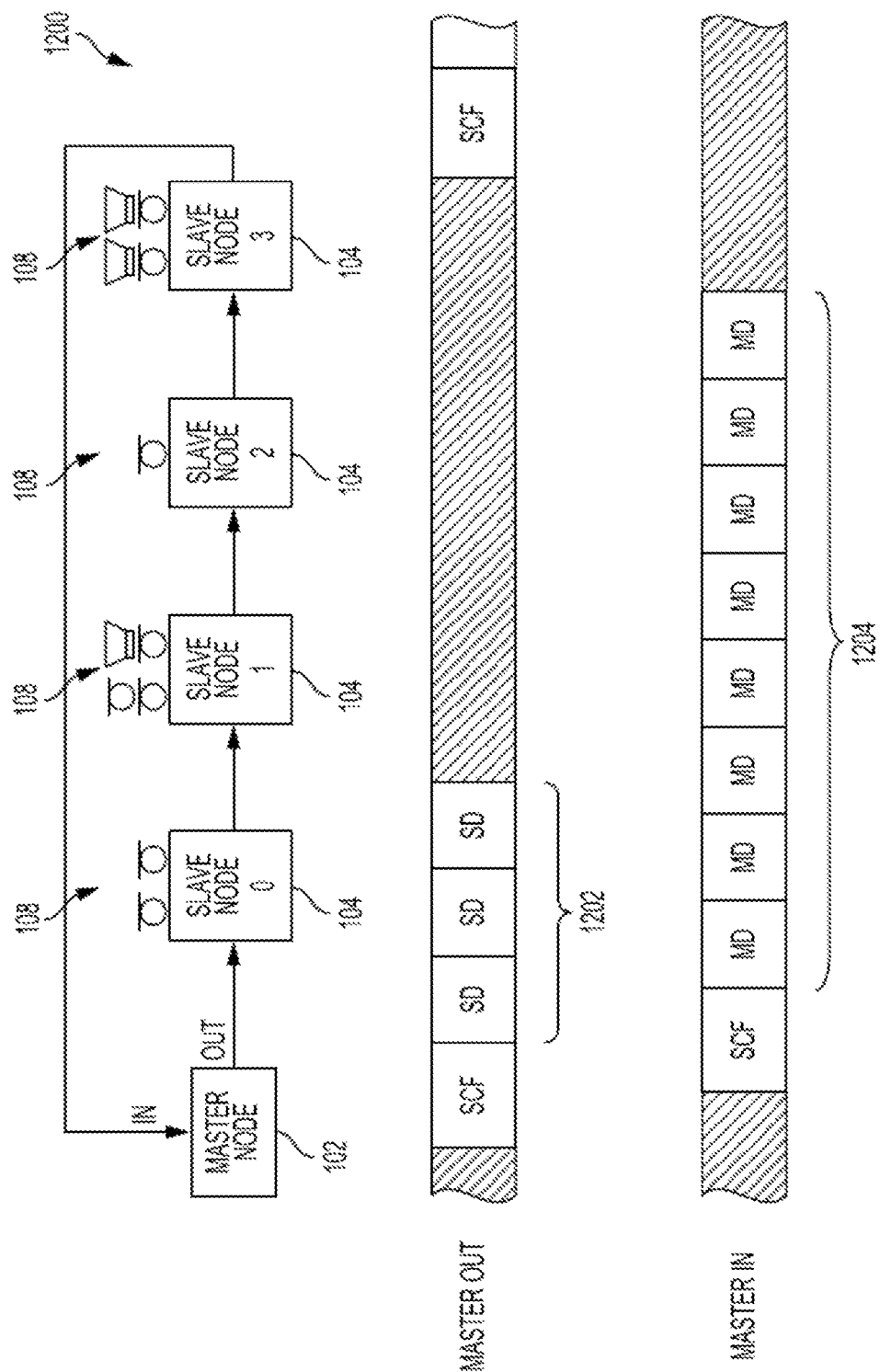
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the master node 102 and four slave nodes 104 in a ring topology, and illustrates signaling and timing considerations for unidirectional communication in the arrangement 1200, in accordance with various embodiments. In such embodiments, the node transceivers 120 in the nodes may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102 transmits a SCF 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
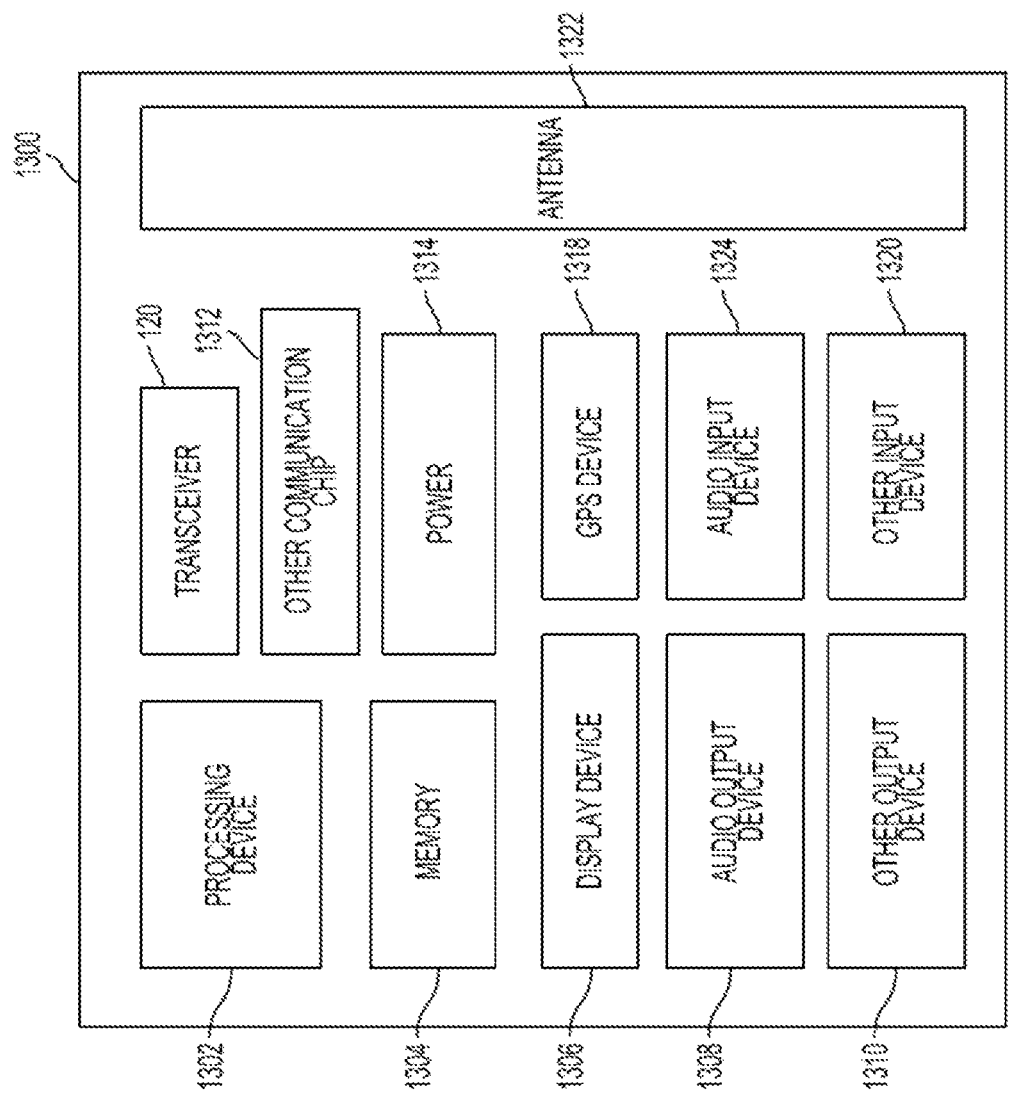
FIG. 13 is a block diagram of a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream bus interface circuitry 132 and the downstream bus interface circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

As noted above, in some embodiments, the system 100 may be a single master-multiple slave system in which the master node 102 configures and maintains the system 100 using a bus 106 (that may include, e.g., a single, differential pair of wires). Digital synchronous data (e.g., audio data), control information, and/or power may be transmitted over this bus 106. The system 100 may also provide a multi-channel, I2S/TDM link between nodes. However, when the system 100 includes a single master node 102, the operation of the system 100 may be at risk for failure if the master node 102 is rendered inoperative (e.g., when the host device 110 fails or the transceiver 120 of the master node 102 fails) or is disconnected from the rest of the system 100 (e.g., by an interruption in the bus 106 between the master node 102 and the slave nodes 104). As used herein, the phrase "the master node 102 is disconnected" may be used to refer to any manner in which the master node 102 is no longer able to control operations of the system 100 (e.g., when the master node 102 is inoperative, when the bus 106 between the master node 102 and some other portion of the system 100 is inoperative, etc.).

Disclosed herein are arrangements and techniques in which one or more of the slave nodes 104 act as auxiliary master nodes in the event that the master node 102 is unable to control the system 100. Such a "dual function" slave node 104 is referred to herein as an "auxiliary master node 104'"; slave nodes 104 that are not auxiliary master nodes 104' are referred to herein as slave nodes 104-2, 104-3, . . . , 104-N. Although various ones of the accompanying drawings illustrate a single auxiliary master node 104' in a communication system 100, this is simply for ease of illustration, and a system 100 may include multiple auxiliary master nodes 104' (e.g., to provide multiple levels of redundancy). For example, when the communication system 100 is used in a vehicle, multiple different auxiliary master nodes 104' may be located in different positions in the vehicle in the event a collision renders part of the communication system 100 inoperative. Further, although various ones of the accompanying drawings illustrate the auxiliary master node 104' as "adjacent" to the master node 102 along the bus 106, this is simply for ease of illustration, and in some embodiments, one or more slave nodes 104 may be located between the master node 102 and the auxiliary master node 104' along the bus 106.

Figure 14:
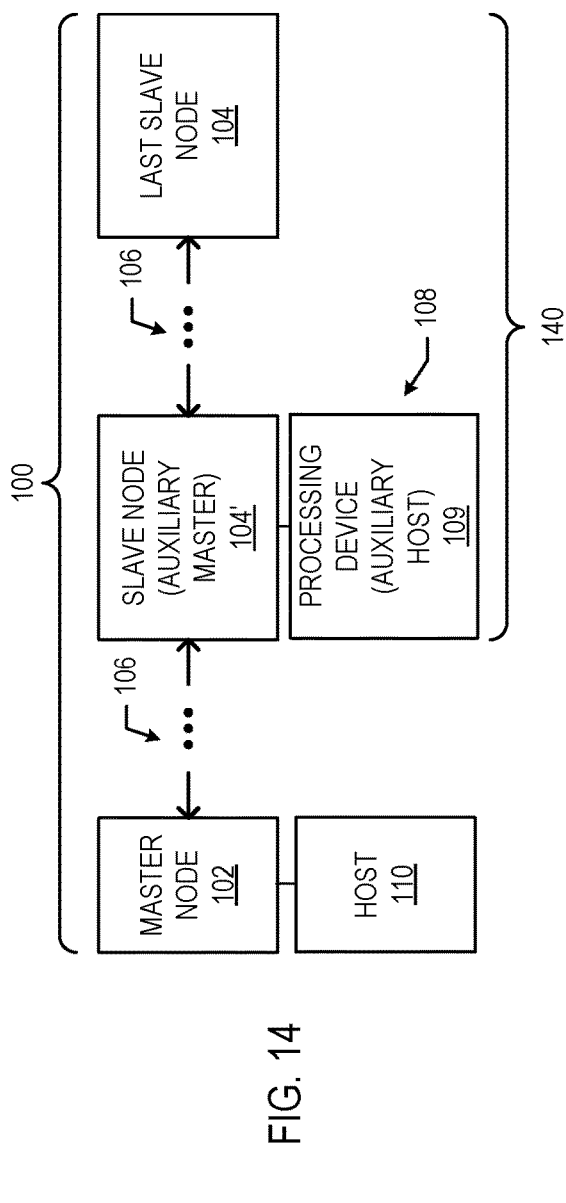
FIG. 14 is a block diagram of a communication system with auxiliary master functionality, in accordance with various embodiments.

FIG. 14 is a block diagram of a communication system 100 including an auxiliary master node 104'. In particular, the communication system 100 includes a host 110 in communication with a master node 102 (e.g., in accordance with any of the embodiments discussed above with reference to FIG. 1), an auxiliary master node 104' (which acts as a slave node when the master node 102 is connected), and one or more additional slave nodes 104 (including a last slave node 104-N). The nodes 102/104 are coupled together by links of a two-wire bus 106 in a daisy-chain fashion, in accordance with any of the embodiments discussed herein. The communication system 100 also includes a processing device 109 which may act as an auxiliary host (in lieu of the host 110) for the auxiliary master node 104' when the master node 102 is disconnected. The processing device 109 may be a peripheral device 108 associated with the auxiliary master node 104'. In some embodiments, the processing device 109 may be a microcontroller or a DSP.

The processing device 109 may communicate with the auxiliary master node 104' in accordance with any of the embodiments discussed herein with reference to communication between the host 110 and the master node 102, and some particular examples are discussed in further detail below. When the master node 102 is disconnected, then the auxiliary master node 104' may act as a master node and the processing device 109 may act as a host to continue running the communication system 100 (e.g., avoiding disruption of a phone call or Bluetooth connection, sustaining audio content, maintaining delivery of a radio program, or enabling emergency calls to be made, as discussed further below). The subsystem governed by the auxiliary master node 104' (e.g., when the master node 102 is disconnected) may be referred to herein as the auxiliary system 140, and may include the auxiliary master node 104' and additional slave nodes 104 downstream from the auxiliary master node 104'.

Any slave node 104 in a system 100 may be an auxiliary master node 104'. An auxiliary master node 104' may be configured to perform operations that the master node 102 is also configured to perform, but which slave nodes 104-2 are not configured to perform. For example, an auxiliary master node 104' may be configured to perform full discovery along the bus 106. An auxiliary master node 104' may also be configured to detect when the master node 102 disconnects from the system 100, configure and run the system 100 until the master node 102 reconnects, and detect the reconnection of the master node 102. In some embodiments, the configuration of an auxiliary master node 104' as a slave node or as a master node may be controlled by the processing device 109; a number of such embodiments are discussed below.

Figure 15:
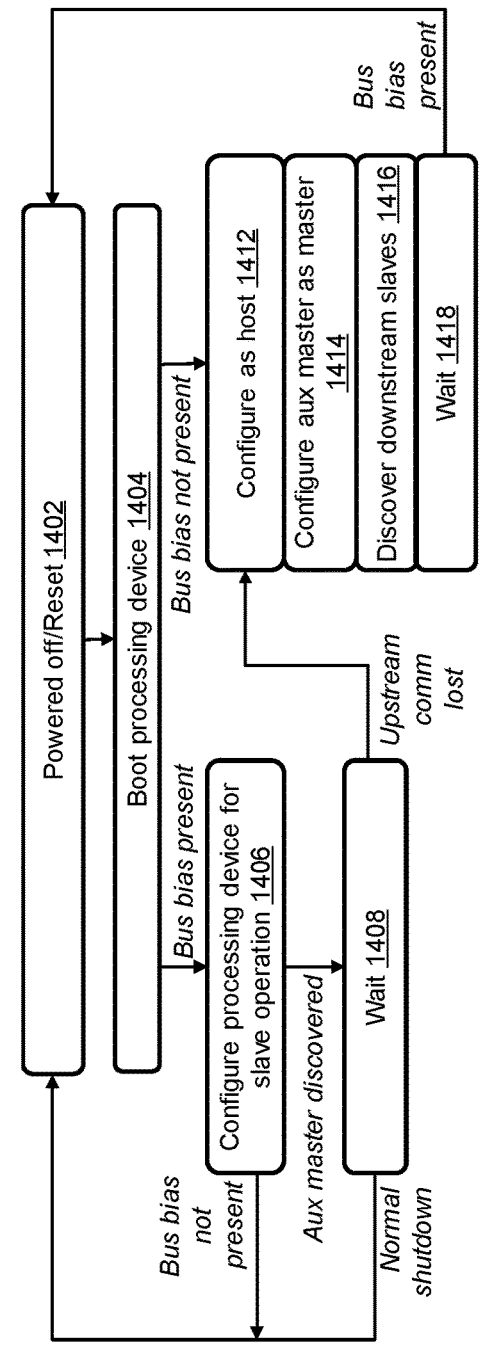
FIG. 15 is a flow diagram of a method of providing auxiliary master functionality in the system of FIG. 14, in accordance with various embodiments.

FIG. 15 is a flow diagram of a method 1400 of providing auxiliary master functionality in the communication system 100 of FIG. 14, in accordance with various embodiments. The method 1400 may be executed by the processing device 109 (in communication with the auxiliary master node 104').

At 1402, the processing device 109 may begin in a powered-off or reset state. The processing device 109 may remain in this state until power is provided to the processing device 109 or a reset of the processing device 109 completes, at which point the processing device 109 may transition to 1404 and may boot up (e.g., loading program instructions for performing the remaining operations of the method 1400). Upon boot-up at 1404, the processing device 109 may determine whether a voltage bias is present on the upstream link of the two-wire bus 106 coupled to the auxiliary master node 104' (e.g., the link of the two-wire bus 106 "facing" the master node 102). The presence of this voltage bias may indicate whether the master node 102 is connected or not; if the voltage bias is not present, the master node 102 may be disconnected, and vice versa. If the processing device 109 determines that the bias on the upstream link of the bus 106 is present, the processing device 109 may proceed to 1406 and 1) configure itself for slave node operation and accept that the auxiliary master node 104' will be configured by the master node 102 over the bus link 106 as a slave, or 2) communicate with the auxiliary master node 104' to configure the auxiliary master node 104' as a slave device. After configuring the processing device 109 for slave operation at 1406, if the processing device 109 determines that the bias on the upstream link of the bus 106 is no longer present, the processing device 109 may proceed to 1402 and may reset. Otherwise, after configuring the processing device 109' as a slave at 1406, the processing device 109 may determine whether the auxiliary master node 104' has been discovered by the master node 102, and if so, may enter a wait state 1408. In the wait state 1408 (or any of the wait states disclosed herein), the processing device 109 may perform slave node processing, as desired. The discovery of the auxiliary master node 104' by the master node 102 may be signaled to the processing device 109 by the auxiliary master node 104' (e.g., using an I/O pin of the auxiliary master node 104', as discussed below). In some embodiments, the signaling to the processing device that indicates that the auxiliary master node 104' has been discovered by the master node 102 may be used to trigger the transition from the powered off/reset state 1402 to the boot state 1404, instead of or in addition to the upstream bus bias triggering that transition.

The processing device 109 may remain in the wait state 1408 until a normal shutdown command is received or communication upstream along the bus 106 is lost. In some embodiments, a normal shutdown command may be provided to the processing device 109 from the host 110/master node 102 through the bus 106 and the auxiliary master node 104' (e.g., by sending a message to the processing device 109 using mailbox functionality over an I2C connection between the auxiliary master node 104' and the processing device 109). If a normal shutdown command is received by the processing device 109 while in the wait state 1408, the processing device 109 may proceed to the powered-off/reset state 1402 and shutdown.

If upstream communication is lost while the processing device 109 is in the wait state 1408, the processing device 109 may proceed to configure itself as a host device at 1412. The processing device 109 may also proceed to configure itself as a host device at 1412 if the processing device 109 determines, after boot-up at 1404, that no voltage bias is present on the upstream link of the two-wire bus 106 coupled to the auxiliary master node 104'. In some embodiments, a normal configuration change request may be provided to the processing device 109 from the host 110/master node 102 through the bus 106 and the auxiliary master node 104' while the processing device 109 is in the wait state 1408 (e.g., by sending a message to the processing device 109 using mailbox functionality over an I2C connection between the auxiliary master node 104' and the processing device 109). If a normal configuration change request is received by the processing device 109 while in the wait state 1408, the processing device 109 may proceed to 1412 and re-configure as a host.

After configuring itself as a host at 1412, the processing device 109 may communicate with the auxiliary master node 104' to configure the auxiliary master node 104' as a master device at 1414. The processing device 109 may then initiate discovery of downstream slave nodes 104 at 1416 (of the auxiliary system 140) in accordance with any of the techniques disclosed herein and then enter a wait state 1418. While in the wait state 1418, if the processing device 109 determines that the upstream bus bias is present, the processing device 109 may proceed to the powered-off/reset state 1402 and reset, or may proceed to 1406 to reconfigure itself for slave node operation and may reconfigure the auxiliary master node 104' as a slave.

Although booting of the processing device 109 is illustrated in various ones of the accompanying figures as occurring in a single stage, booting of the processing device 109 may be performed over multiple different stages of operation in any of the accompanying embodiments. For example, a first stage of booting may be performed at 1404, while a second stage of booting may take place at 1406 or 1412. The presence of a bus bias may be used to determine which of the second stage of boot operations to perform (e.g., 1406 when an upstream bus bias is present, and 1412 when the upstream bus bias is not present).

Figure 16:
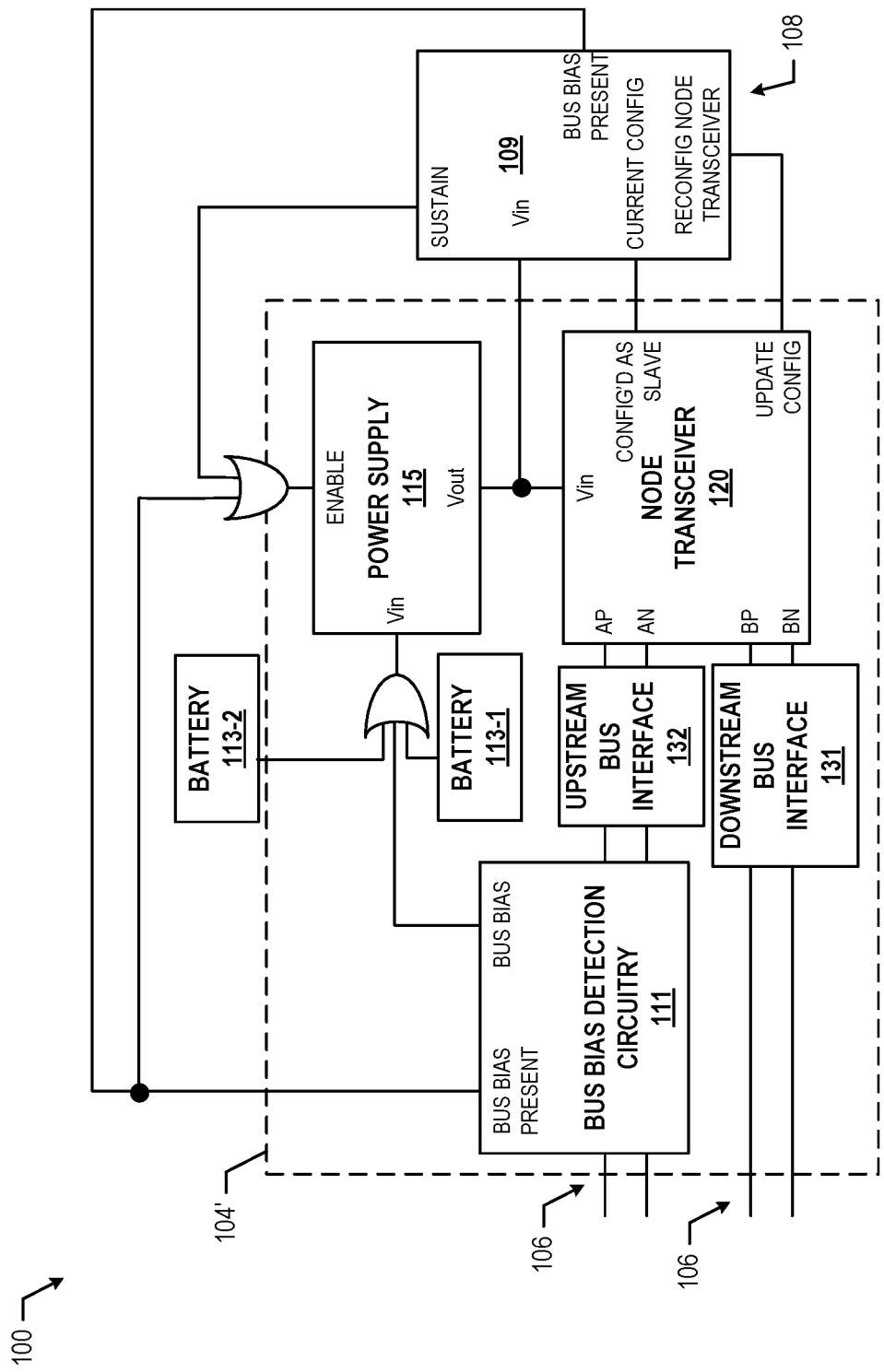
FIG. 16 illustrates a particular example of a portion of the communication system of FIG. 14, in accordance with various embodiments.

FIG. 16 illustrates an example implementation of a portion of the communication system 100 of FIG. 14. In particular, FIG. 16 illustrates an example of the auxiliary master node 104' (including a node transceiver 120 and associated circuitry), an example of the associated processing device 109, and example interconnections between them. In FIG. 16, the auxiliary master node 104' includes a node transceiver 120 (which may take the form of any of the node transceivers 120 disclosed herein), bus bias detection circuitry 111, upstream bus interface circuitry 132, downstream bus interface circuitry 131, and a power supply 115. The input voltage (Vin) to the power supply 115 may be provided by a battery 113-1 included in the auxiliary master node 104', or by an external battery 113-2. In some embodiments, the battery 113-1 may be charged (e.g., tricklecharged) by the bias on the bus 106. The bus bias detection circuitry 111 may be coupled to the upstream link of the two-wire bus 106, and may be configured to provide two different outputs: a "bus bias present" logic signal indicating whether or not a voltage bias is present between the two wires of the upstream link 106, and the "bus bias" voltage itself. The bus bias voltage may be provided to the voltage input of the power supply 115, as shown (e.g., to allow the node transceiver 120 to power itself with the bus bias, when present). The power supply 115 may thus draw its input voltage from any one or more of the bus bias, the battery 113-1, and/or the battery 113-2. The voltage output (Vout) from the power supply 115 may be received at a voltage input (Vin) of the node transceiver 120 and at a voltage input (Vin) of the processing device 109. In some embodiments, the power supply 115 may include a voltage regulator or multiple voltage regulators to generate different output voltages (e.g. also for the downstream bias or other peripheral devices in the node).

The upstream bus interface circuitry 132 may be disposed between the bus bias detection circuitry 111 and the upstream ports (AP and AN) of the node transceiver 120. As discussed above, the upstream bus interface circuitry 132 may terminate the bus bias, filter the differential signal provided over the bus 106, and provide electromagnetic compatibility (EMC) and electrostatic discharge (ESD) protection. The downstream bus interface circuitry 131 may be disposed between the downstream ports (BP and BN) of the node transceiver 120 and the downstream link of the two-wire bus 106, and may take the form of any of the embodiments disclosed herein. As discussed above, the downstream bus interface circuitry 131 may combine the differential signal with the bus bias for transmission over the bus 106, filter the differential signal provided over the bus 106, and provide EMC and ESD protection.

The power supply 115 may also include an enable input that controls whether the power supply 115 provides a voltage output (Vout) or not. The enable input of the power supply 115 may be coupled to the "bus bias present" signal from the bus bias detection circuitry 111 and to a "sustain" output of the processing device 109. The processing device 109 generates the sustain output when the processing device receives an indication from the bus bias detection circuitry 111 that the bus bias is present (i.e., via the "bus bias present" signal received at the processing device 109). As discussed above, when the bus bias goes away, the processing device 109 may be configured as a host and the auxiliary master node 104' may be configured as a master device. Thus, the power supply 115 may be enabled to generate an output voltage when the bus bias is present (e.g., when the auxiliary master node 104' is operating as a slave) or the processing device generates an appropriate sustain output (e.g., when the auxiliary master node 104' is operating as a master).

The processing device 109 may include an input ("current config") for receiving an indicator of the current configuration of the auxiliary master node 104' from an output ("config'd as slave") of the node transceiver 120. In particular, the node transceiver 120 may use the "config'd as slave" output to indicate to the processing device 109 whether the node transceiver 120 is currently configured as a slave or as a master. For example, the "current config" and "config'd as slave" inputs/outputs may be part of a GPIO, SPI, or I2C interface (e.g., including the I2C transceiver 129 of the node transceiver 120, discussed above) through which configuration information may be transferred. If the processing device 109 receives an indication that the node transceiver 120 is not currently configured as a slave (e.g., has not been discovered as a slave device), the processing device 109 may provide a sustain output to the power supply 115. In some embodiments, if the processing device 109 receives an indication that the node transceiver 120 is currently configured as a slave (e.g., has been discovered as a slave device, as discussed above), the processing device 109 may not provide a sustain output to the power supply 115, while in other embodiments, the processing device 109 may provide a sustain output to the power supply 115 regardless of whether the node transceiver 120 is configured as a slave or as a master. In some embodiments, the processing device 109 may cease providing a sustain output to the power supply 115 when the processing device 109 undergoes a normal shutdown or otherwise desires to shut down the auxiliary master node 104'.

The processing device 109 may include an output ("reconfig node transceiver") for providing signals to an input ("update config") of the node transceiver 120 to cause the node transceiver 120 to configure itself as a master or as a slave. For example, the "reconfig node transceiver" and "update config" inputs/outputs may be part of a GPIO, SPI, or I2C interface (e.g., including the I2C transceiver 129 of the node transceiver 120, discussed above) through which configuration information may be transferred. The processing device 109 may cause the node transceiver 120 to reconfigure itself based on the "bus bias present" signal received by the processing device 109 (e.g., as discussed above with reference to FIG. 15).

Figure 17:
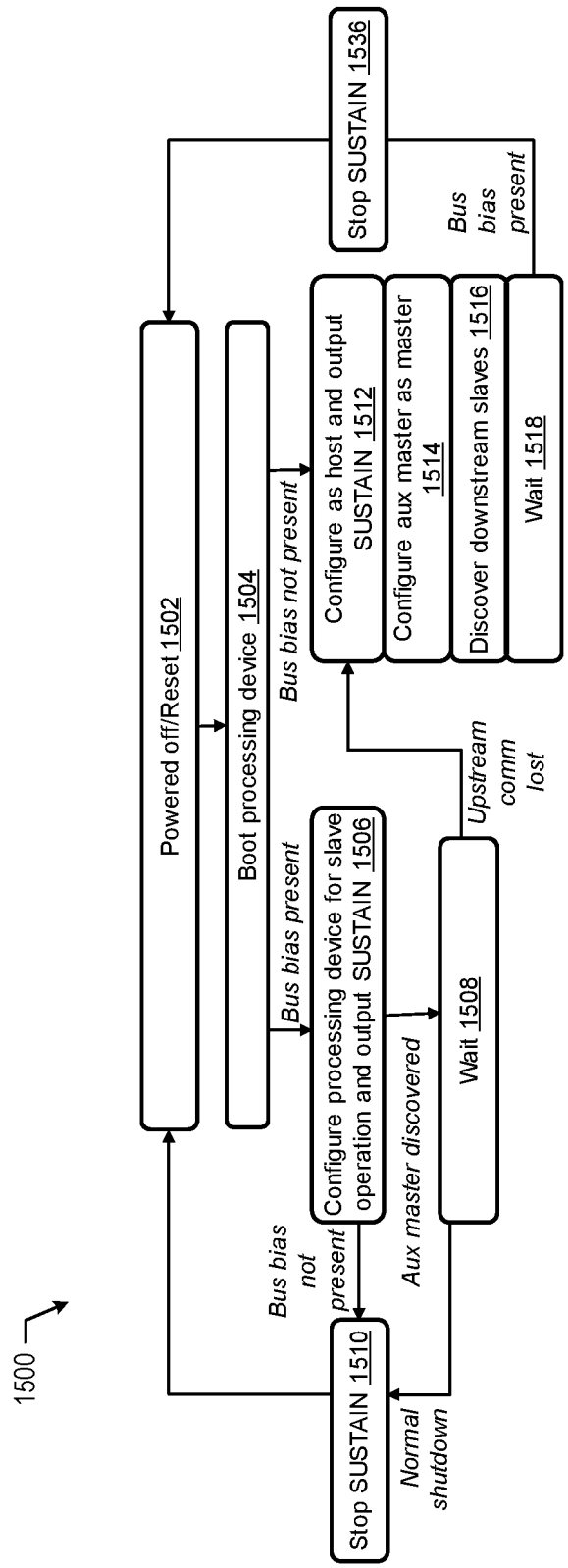
FIG. 17 is a flow diagram of a method of providing auxiliary master functionality in the system of FIG. 16, in accordance with various embodiments.

FIG. 17 is a flow diagram of a method 1500 of providing auxiliary master functionality in the communication system 100 of FIG. 16, in accordance with various embodiments. The method 1500 may be executed by the processing device 109 (in communication with the auxiliary master node 104') of FIG. 17.

At 1502, the processing device 109 may begin in a powered-off or reset state. The processing device 109 may remain in the state until power is provided to the processing device 109 or a reset of the processing device 109 completes, at which point the processing device 109 may transition to 1504 and may boot up (e.g., loading program instructions for performing the remaining operations of the method 1500). Upon boot-up at 1504, the processing device 109 may determine whether a voltage bias is present on the upstream link of the two-wire bus 106 coupled to the auxiliary master node 104' (e.g., the link of the two-wire bus 106 "facing" the master node 102) via the "bus bias present" output of the bus bias detection circuitry 111. The presence of this voltage bias may indicate whether the master node 102 is connected or not; if the voltage bias is not present, the master node 102 may be disconnected, and vice versa. If the processing device 109 determines that the bias on the upstream link of the bus 106 is present (via the "bus bias present" signal), the processing device 109 may proceed to 1506 and 1) configure itself for slave node operation and accept that the auxiliary master node 104' will be configured by the master node 102 over the bus link 106 as a slave, or 2) communicate with the node transceiver 120 to configure the node transceiver 120 as a slave device (via the "reconfig node transceiver" output of the processing device 109 and the "update config" input of the node transceiver 120) and may output a sustain signal to the power supply 115. After configuring the processing device 109 for slave operation at 1506, if the processing device 109 determines that the bias on the upstream link of the bus 106 is no longer present (via the "bus bias present" signal), the processing device 109 may proceed to 1510 and stop outputting the sustain signal, and then to 1502 to reset. Otherwise, after configuring the processing device 109 as a slave at 1506, the processing device 109 may determine whether the node transceiver 120 has been discovered by the master node 102 (e.g., via the "config'd as slave" output from the node transceiver 120 received at the "current config" input of the processing device 109), and if so, may enter a wait state 1508.

The processing device 109 may remain in the wait state 1508 until a normal shutdown command is received or communication upstream along the bus 106 is lost. In some embodiments, a normal shutdown command may be provided to the processing device 109 from the host 110/master node 102 through the bus 106 and the auxiliary master node 104' (e.g., by sending a message to the processing device 109 using mailbox functionality over an I2C connection between the auxiliary master node 104' and the processing device 109). If a normal shutdown command is received by the processing device 109 while in the wait state 1408, the processing device 109 may stop outputting the sustain signal at 1510 and then proceed to the powered-off/reset state 1502 to shut down.

Figure 18:
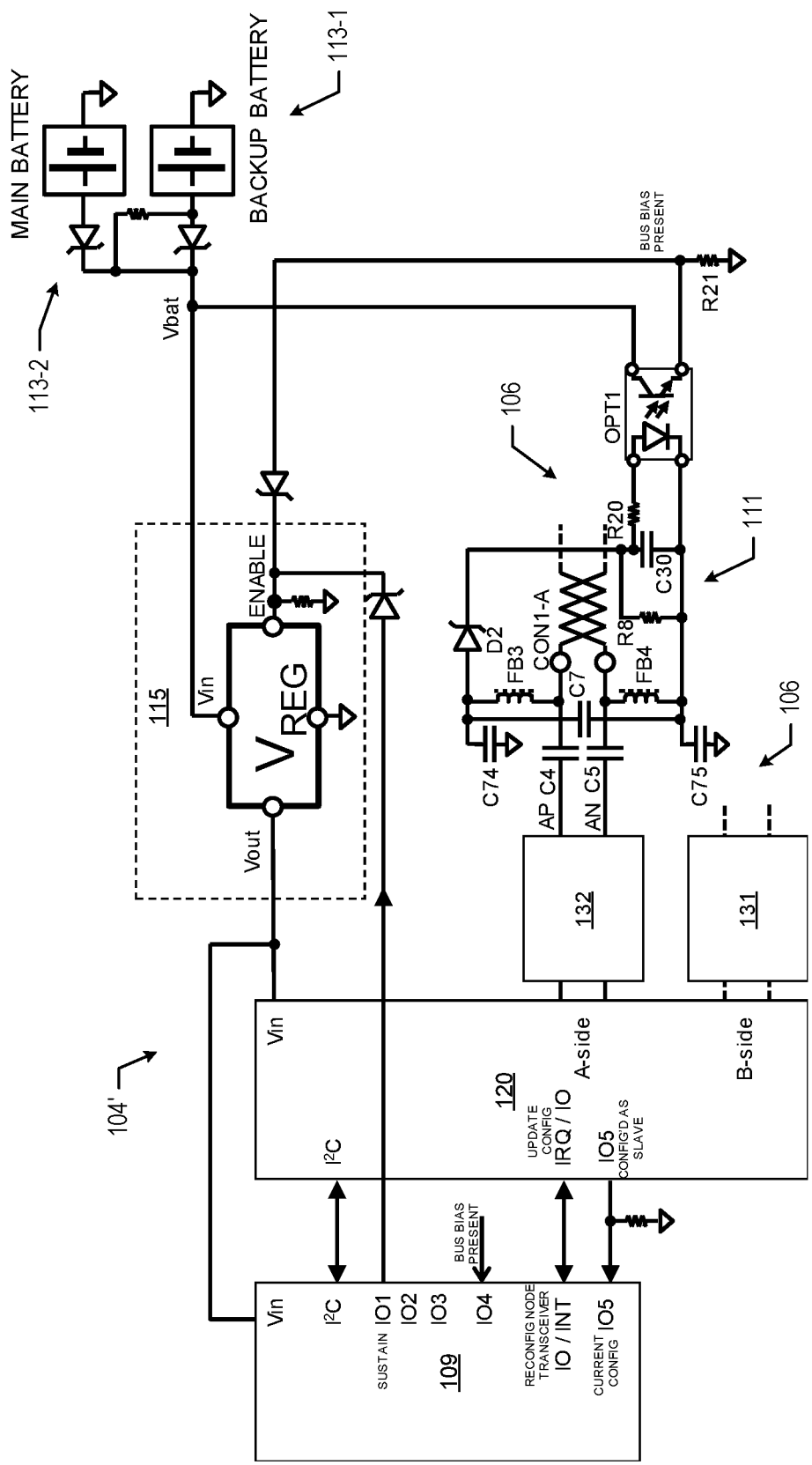
FIG. 18 is a schematic illustration of an example implementation of the portion of the communication system illustrated in FIG. 16, in accordance with various embodiments.

If upstream communication is lost while the processing device 109 is in the wait state 1508 (e.g., via the "config'd as slave" output from the node transceiver 120 received at the "current config" input of the processing device 109), the processing device 109 may proceed to configure itself as a host device at 1512 and may continue providing a sustain signal to the power supply 115. The processing device 109 may also proceed to configure itself as a host device at 1512 and may output a sustain signal if the processing device 109 determines, after boot-up at 1504, that no voltage bias is present on the upstream link of the two-wire bus 106 coupled to the auxiliary master node 104'. After configuring itself as a host at 1512, the processing device 109 may communicate with the node transceiver 120 to configure the node transceiver 120 as a master device at 1514 (via the "reconfig node transceiver" output of the processing device 109 and the "update config" input of the node transceiver 120). The processing device 109 may then initiate discovery of downstream slave nodes 104 at 1516 (of the auxiliary system 140) in accordance with any of the techniques disclosed herein and then enter a wait state 1518. While in the wait state 1518, if the processing device 109 determines that the upstream bus bias is present, the processing device 109 may stop outputting the sustain signal at 1536 and proceed to the powered-off/reset state 1502 to reset. In some embodiments, the detection of bus bias in the wait state 1518 may cause the processing device 109 to proceed to 1506 while continuing to output the sustain signal. In some embodiments, only an external event (e.g., actuation of a push button) allows the processing device 109 to proceed from the wait state 1518 to the state 1502 (or any other state). FIG. 18 illustrates a particular embodiment of the portion of the communication system 100 illustrated in FIG. 16. FIG. 18 illustrates particular embodiments of the bus bias detection circuitry 111 and the power supply 115. In the embodiment of FIG. 18, the battery 113-1 may be a "backup" battery associated with the auxiliary master node 104', while the "external" battery 113-2 may be the "main" battery of the communication system 100 (e.g., a primary battery in a vehicle). The node transceiver 120 and the processing device 109 may communicate via an I2C interface or SPI interface, and may also communicate via I2S/TDM I/O pins to provide the "reconfig node transceiver," "current config," "update config," and "config'd as slave" terminals. The processing device 109 may set the 101 output high to generate the sustain signal (and set the 101 output low to stop the sustain signal), and the 105 input of the processing device 109 may be forced high by the master node 102 when the node transceiver 120 is configured and discovered as a slave.

In some embodiments, the auxiliary system 140 may also provide auxiliary call support functionality. As used herein, "auxiliary call support functionality" refers to the ability of the auxiliary system 140 to allow a telephone call or other external communication to be placed when the master node 102 is disconnected. For example, in a vehicle setting, the master node 102 and the host 110 may be located in a head unit of the vehicle, and may together provide call support functionality under normal operating conditions. If a collision occurs or the head unit is otherwise damaged so as to disconnect the master node 102, auxiliary call support functionality may allow a telephone call to be placed by the auxiliary system 140 (e.g., an emergency call). Although various ones of the auxiliary call support systems disclosed herein refer to the ability to make "telephone calls," the auxiliary call support systems and techniques disclosed herein may be used to provide any kind of auxiliary messaging or external communication functionality (e.g., short message service (SMS) messages, etc.). This messaging functionality may include wireless communication (e.g., a telephone call or SMS message may be wirelessly transferred between the communication system 100 and a cellular or other wireless network).

Figure 19:
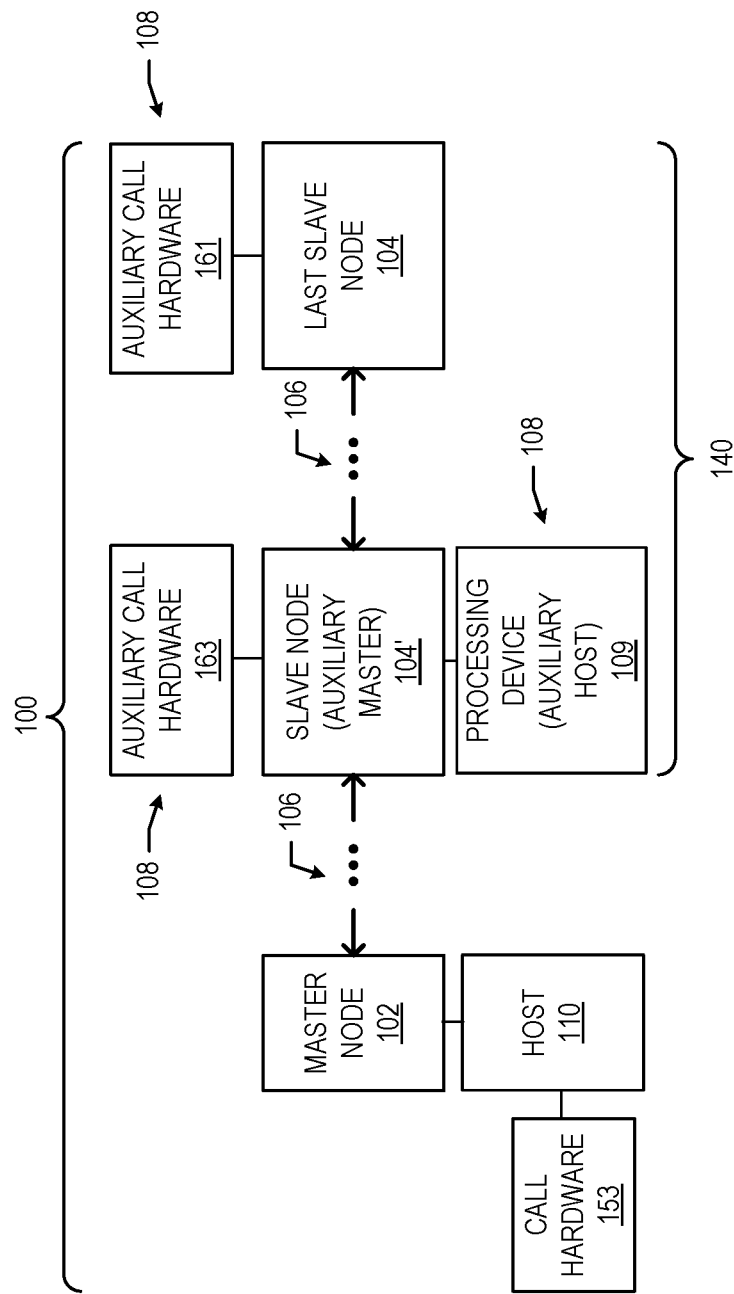
FIG. 19 is a block diagram of a communication system with auxiliary call support functionality, in accordance with various embodiments.

FIG. 19 is a block diagram of a communication system 100 with auxiliary call support functionality. A number of the elements of FIG. 19 are shared with the communication system 100 of FIG. 14; these elements may take any of the forms discussed herein with reference to FIG. 14, and will not be repeated for clarity of discussion. In the communication system of FIG. 19, the host 110 may be coupled to call hardware 153 (which may include, for example, a modem, an antenna, analog or digital microphones, speakers, ADCs, DACs, and/or any other suitable equipment for providing telephone functionality). Auxiliary call hardware 163 and 161 may be coupled to the auxiliary master node 104' and one or more of the slave nodes 104, respectively. The auxiliary call hardware 163 and 161 may be peripheral devices 108 for their associated nodes. The auxiliary call hardware 163 and 161 may individually include any of the example elements discussed above with reference to the call hardware 153. During normal operation of the communication system 100, the call hardware 153 (together with any desired elements of the auxiliary call hardware 163 and 161) may conduct telephone calls; when the master node 102 is disconnected (and therefore the call hardware 153 is no longer available for making telephone calls), the auxiliary call hardware 163 and 161 may conduct telephone calls on the auxiliary system 140. For example, the call hardware 153 may include speakers, the auxiliary call hardware 163 may include a modem and speakers, and the auxiliary call hardware 161 may include one or more microphones; during normal operation, the speakers of the call hardware 153, the modem of the auxiliary call hardware 163, and the microphones of the auxiliary call hardware 161 may together be used to place telephone calls, while the auxiliary call hardware 163 and 161 may together be used to place telephone calls when the master node 102 is disconnected. In some embodiments, none of the slave nodes 104 are associated with any call hardware 157, and instead, the auxiliary call hardware 163 itself includes all of the hardware elements needed to place a telephone call.

Auxiliary call hardware may be located at a different node than where the auxiliary master node 104' resides, and can be accessed over the bus 106. Phone numbers or other communication-related data may also be stored at a different slave node 104 linked to the auxiliary master node 104' by the bus 106. For example, a Bluetooth device may automatically initiate a call to the last called phone number. Phone numbers or other communication-related data may be presented directly or to the auxiliary call hardware or reside within the auxiliary call hardware (e.g., without involvement of the auxiliary host).

Figure 20:
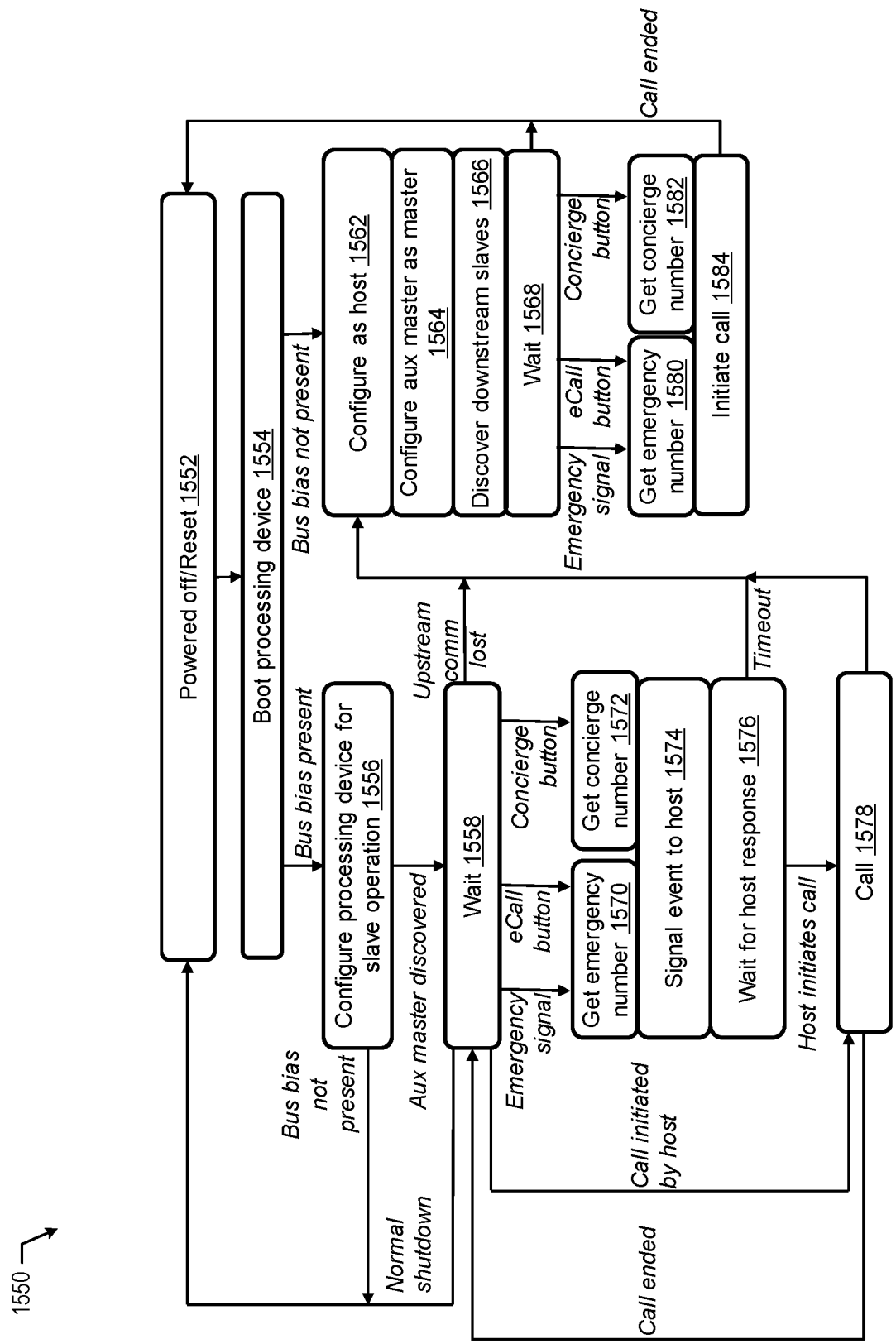
FIG. 20 is a flow diagram of a method of providing auxiliary call support functionality in the system of FIG. 19, in accordance with various embodiments.

FIG. 20 is a flow diagram of a method 1550 of providing auxiliary call support functionality in the communication system 100 of FIG. 19, in accordance with various embodiments. The method 1550 may be executed by the processing device 109 (in communication with the auxiliary master node 104').

At 1552, the processing device 109 may begin in a powered-off or reset state. The processing device 109 may remain in this state until power is provided to the processing device 109 or a reset of the processing device 109 completes, at which point the processing device 109 may transition to 1554 and may boot up (e.g., loading program instructions for performing the remaining operations of the method 1550). Upon boot-up at 1554, the processing device 109 may determine whether a voltage bias is present on the upstream link of the two-wire bus 106 coupled to the auxiliary master node 104' (e.g., the link of the two-wire bus 106 "facing" the master node 102). The presence of this voltage bias may indicate whether the master node 102 is connected or not; if the voltage bias is not present, the master node 102 may be disconnected, and vice versa. If the processing device 109 determines that the bias on the upstream link of the bus 106 is present, the processing device 109 may proceed to 1556 and 1) configure itself for slave node operation and accept that the auxiliary master node 104' will be configured by the master node 102 over the bus link 106 as a slave, or 2) communicate with the auxiliary master node 104' to configure the auxiliary master node 104' as a slave device. After configuring the processing device 109' for slave operation at 1556, if the processing device 109 determines that the bias on the upstream link of the bus 106 is no longer present, the processing device 109 may proceed to 1552 and may reset. Otherwise, after configuring the processing device 109' as a slave at 1556, the processing device 109 may determine whether the auxiliary master node 104' has been discovered by the master node 102, and if so, may enter a wait state 1558. The discovery of the auxiliary master node 104' by the master node 102 may be signaled to the processing device 109 by the auxiliary master node 104' (e.g., using an I/O pin of the auxiliary master node 104', as discussed below). In some embodiments, the signaling to the processing device that indicates that the auxiliary master node 104' has been discovered by the master node 102 may be used to trigger the transition from the powered off/reset state 1552 to the boot state 1554, instead of or in addition to the upstream bus bias triggering that transition.

The processing device 109 may remain in the wait state 1558 until a normal shutdown command is received, a call-triggering signal is received, the host 110 initiates a call using the auxiliary call hardware 163 (associated with the auxiliary master node 104'), or communication upstream along the bus 106 is lost. In some embodiments, a normal shutdown command may be provided to the processing device 109 from the host 110/master node 102 through the bus 106 and the auxiliary master node 104' (e.g., by sending a message to the processing device 109 using mailbox functionality over an I2C connection between the auxiliary master node 104' and the processing device 109). If a normal shutdown command is received by the processing device 109 while in the wait state 1558, the processing device 109 may proceed to the powered-off/reset state 1552 and shutdown. In some embodiments, a normal configuration change request may be provided to the processing device 109 from the host 110/master node 102 through the bus 106 and the auxiliary master node 104' while the processing device 109 is in the wait state 1558 (e.g. by sending a message to the processing device 109 using mailbox functionality over an I2C connection between the auxiliary master node 104' and the processing device 109). If a normal configuration change request is received by the processing device 109 while in the wait state 1558, the processing device 109 may proceed to 1562 and re-configure itself as a host.

In the wait state 1558, if an emergency signal is received, or if an emergency call ("eCall") button is pressed, the processing device 109 may retrieve an emergency number (stored, e.g., in a memory or otherwise accessible to the processing device 109). The emergency number may be, for example, 911 in the United States of America. An emergency signal may be automatically generated by other hardware in the event of an emergency. For example, in a vehicle setting, an emergency signal may be generated by the vehicle upon deployment of the airbags, and may be transmitted to the processing device 109 via a CAN bus or another secondary control bus (e.g., an emergency sensor or signal wire), not shown. An emergency call button may be manually actuated by a user to trigger the dialing of the emergency number. In the wait state 1558, if a concierge button is pressed, the processing device 109 may retrieve a concierge number (stored, e.g., in a memory in or otherwise accessible to the processing device 109). The concierge number may be associated with a specialized service for providing amenities and support; for example, in a vehicle setting, dialing the concierge number may access a service that provides airline ticketing, hotel reservations, on-site assistance, weather information, mechanical services, and/or insurance claims assistance, among other things. A concierge button may be manually actuated by a user to trigger the dialing of the concierge number. Although particular types of call-triggering events (e.g., emergency signals, emergency call buttons, and concierge call buttons) are illustrated in FIG. 20 and others of the accompanying figures, these are simply examples, and any other suitable call-triggering event (e.g., automatic or manual) may be used.

After retrieving the emergency number (at 1570) or the concierge number (at 1572), the processing device 109 may signal the retrieval of the number to the host 110 at 1574 (e.g., by sending a message to the host 110 using mailbox functionality over an I2C connection between the auxiliary master node 104' and the processing device 109), and then wait for a response from the host 110 at 1576 (e.g., by sending a message to the processing device 109 using mailbox functionality over an I2C connection between the auxiliary master node 104' and the processing device 109). If the host 110 successfully indicates that the call should be initiated, the processing device 109 may place the call to the retrieved number at 1578. The method 1550 also illustrates that, when the processing device 109 is in the wait state 1558, the processing device may receive an instruction from the host 110 to place a call to any specified number (e.g., by sending a message to the processing device 109 using mailbox functionality over an I2C connection between the auxiliary master node 104' and the processing device 109), and the processing device 109 may proceed to place the call at 1578. When the call placed at 1578 ends, the processing device 109 may return to the wait state 1558.

If the host 110 is unresponsive while the processing device 109 is waiting for a response from the host 110 at

1576, or the upstream communication is lost while the processing device 109 is in the wait state 1558 or the call state 1578 (e.g., during an emergency call), the processing device 109 may proceed to configure itself as a host device at 1562. The processing device 109 may also proceed to configure itself as a host device at 1562 if the processing device 109 determines, after boot-up at 1554, that no voltage bias is present on the upstream link of the two-wire bus 106 coupled to the auxiliary master node 104'. After configuring itself as a host at 1562, the processing device 109 may communicate with the auxiliary master node 104' to configure the auxiliary master node 104' as a master device at 1564. The processing device 109 may then initiate discovery of downstream slave nodes 104 at 1566 (of the auxiliary system 140) in accordance with any of the techniques disclosed herein and then enter a wait state 1568. While in the wait state 1568, if the processing device 109 determines that the upstream bus bias is present, the processing device 109 may proceed to the powered-off/reset state 1552 and reset, or may proceed to 1556 to reconfigure itself for slave node operation and may reconfigure the auxiliary master node 104' as a slave.

In the wait state 1568, if an emergency signal is received, or if an emergency call ("eCall") button is pressed, the processing device 109 may retrieve an emergency number (stored, e.g., in a memory in or otherwise accessible to the processing device 109), in accordance with any of the embodiments discussed above. In the wait state 1558, if a concierge button is pressed, the processing device 109 may retrieve a concierge number (stored, e.g., in a memory in or otherwise accessible to the processing device 109), in accordance with any of the embodiments discussed above. After retrieving the emergency number (at 1580) or the concierge number (at 1582), the processing device 109 may place the call to the retrieved number at 1584. When the call placed at 1584 ends, the processing device 109 may proceed to the powered-off/reset state 1552 and reset. In alternate embodiments, when the call placed at 1584 ends, the processing device 109 may return to the wait state 1568.

In alternate embodiments, the processing device 109 may transition directly from 1570 to 1562 and then reset, or may reconfigure the auxiliary master node 104 to act as a slave.

Figure 21:
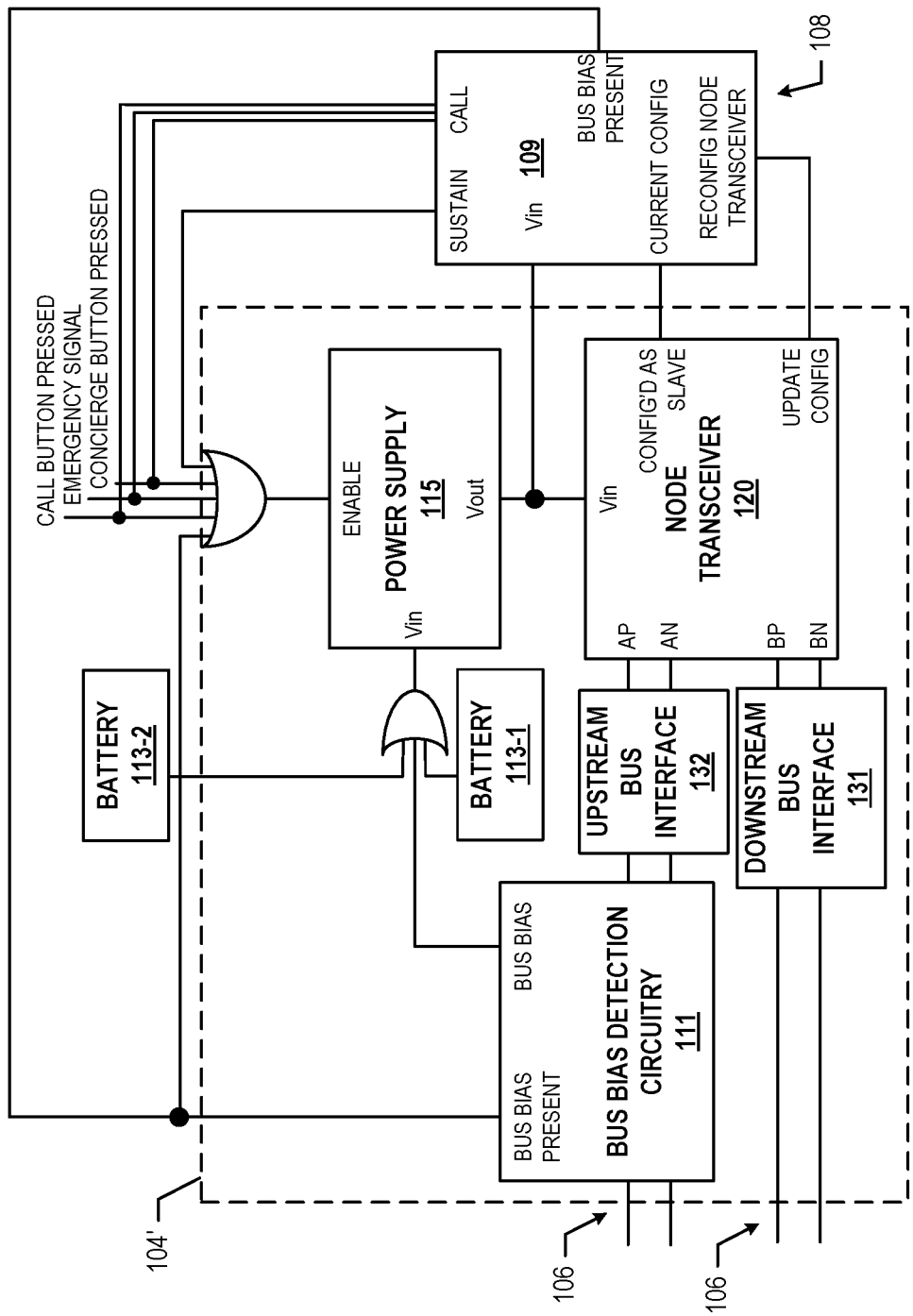
FIG. 21 illustrates a particular example of a portion of the communication system of FIG. 19, in accordance with various embodiments.

FIG. 21 illustrates an example implementation of a portion of the communication system 100 of FIG. 19. In particular, FIG. 21 illustrates an example of the auxiliary master node 104' (including a node transceiver 120 and associated circuitry), an example of the associated processing device 109, and example interconnections between them. A number of the elements of FIG. 21 are shared with the communication system 100 of FIG. 16; these elements may take any of the forms discussed herein with reference to FIG. 16, and will not be repeated for clarity of discussion.

In the embodiment of FIG. 21, the enable input of the power supply 115 may be coupled to the "bus bias present" signal from the bus bias detection circuitry 111, to the "sustain" output of the processing device 109, and to call-triggering signals (e.g., emergency signal, eCall button, and concierge button). Thus, the power supply 115 may be enabled to generate an output voltage when the bus bias is present (e.g., when the auxiliary master node 104' is operating as a slave), the processing device generates an appropriate sustain output (e.g., when the auxiliary master node 104' is operating as a master), or a call-triggering signal is received.

The processing device 109 of FIG. 21 may include call inputs ("CALL") that may receive various call-triggering signals (e.g., emergency signal, eCall button, and concierge button), and in response to these signals, aid or control the process of placing telephone calls as discussed above with reference to FIG. 20. The call inputs may be, for example, any suitable I/O pins of the processing device 109.

Figure 22:
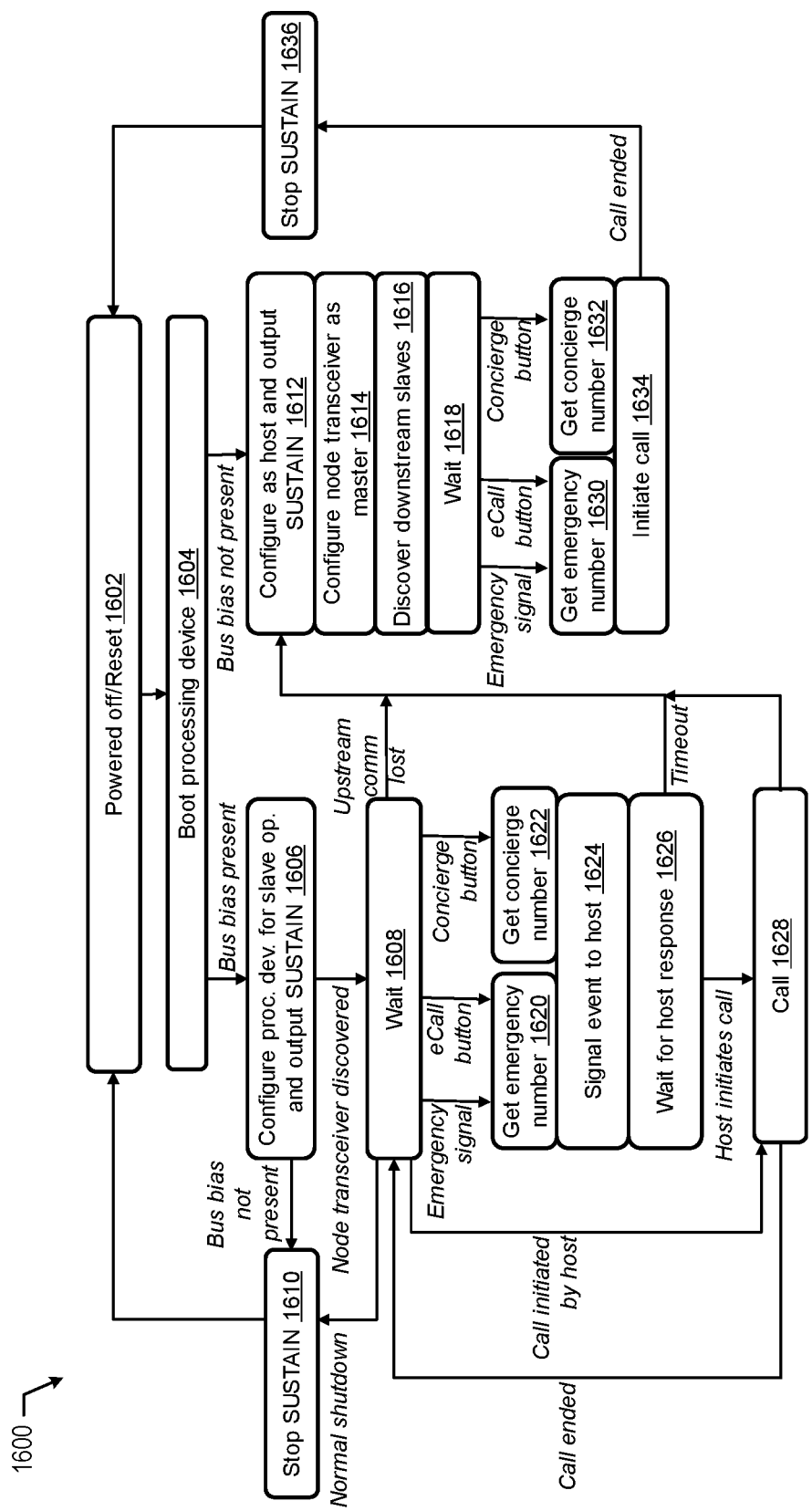
FIG. 22 is a flow diagram of a method of providing auxiliary call support functionality in the system of FIG. 21, in accordance with various embodiments.

FIG. 22 is a flow diagram of a method 1600 of providing auxiliary master functionality in the communication system 100 of FIG. 21, in accordance with various embodiments. The method 1600 may be executed by the processing device 109 (in communication with the auxiliary master node 104') of FIG. 21.

At 1602, the processing device 109 may begin in a powered-off or reset state. The processing device 109 may remain in this state until power is provided to the processing device 109 or a reset of the processing device 109 completes, at which point the processing device 109 may transition to 1604 and may boot up (e.g., loading program instructions for performing the remaining operations of the method 1500). Upon boot-up at 1604, the processing device 109 may determine whether a voltage bias is present on the upstream link of the two-wire bus 106 coupled to the auxiliary master node 104' (e.g., the link of the two-wire bus 106 "facing" the master node 102) via the "bus bias present" output of the bus bias detection circuitry 111. The presence of this voltage bias may indicate whether the master node 102 is connected or not; if the voltage bias is not present, the master node 102 may be disconnected, and vice versa. If the processing device 109 determines that the bias on the upstream link of the bus 106 is present (via the "bus bias present" signal), the processing device 109 may proceed to 1606 and 1) configure itself for slave node operation and accept that the auxiliary master node 104' will be configured by the master node 102 over the bus link 106 as a slave, or 2) communicate with the auxiliary master node 104' to configure the auxiliary master node 104' as a slave device (via the "reconfig node transceiver" output of the processing device 109 and the "update config" input of the node transceiver 120), and may output a sustain signal to the power supply 115. After configuring the processing device 109 for slave operation at 1606, if the processing device 109 determines that the bias on the upstream link of the bus 106 is no longer present (via the "bus bias present" signal), the processing device 109 may proceed to 1610 and stop outputting the sustain signal, and then to 1602 to reset. Otherwise, after configuring the processing device 109 for slave operation at 1606, the processing device 109 may determine whether the node transceiver 120 has been discovered by the master node 102 (e.g., via the "config'd as slave" output from the node transceiver 120 received at the "current config" input of the processing device 109), and if so, may enter a wait state 1608.

The processing device 109 may remain in the wait state 1608 until a normal shutdown command is received, a call-triggering signal is received, the host 110 initiates a call using the auxiliary call hardware 163 (associated with the auxiliary master node 104'), or communication upstream along the bus 106 is lost. In some embodiments, a normal shutdown command may be provided to the processing device 109 from the host 110/master node 102 through the bus 106 and the auxiliary master node 104' (e.g., by sending a message to the processing device 109 using mailbox functionality over an I2C connection between the auxiliary master node 104' and the processing device 109). If a normal shutdown command is received by the processing device 109 while in the wait state 1608, the processing device 109 may proceed to 1610 and stop outputting the sustain signal, and then to the powered-off/reset state 1602 to shut down. In some embodiments, a normal configuration change request may be provided to the processing device 109 from the host 110/master node 102 through the bus 106 and the auxiliary master node 104' while the processing device 109 is in the wait state 1658 (e.g., by sending a message to the processing device 109 using mailbox functionality over an I2C connection between the auxiliary master node 104' and the processing device 109). If a normal configuration change request is received by the processing device 109 while in the wait state 1658, the processing device 109 may proceed to 1662 and re-configure itself as a host while continuing to provide a sustain signal to the power supply 115.

In the wait state 1608, if an emergency signal is received (e.g., via the CALL inputs of the processing device 109), or if an emergency call ("eCall") button is pressed (e.g., via the CALL inputs of the processing device 109), the processing device 109 may retrieve an emergency number (stored, e.g., in a memory in or otherwise accessible to the processing device 109), in accordance with any of the embodiments discussed above. In the wait state 1608, if a concierge button is pressed (e.g., via the CALL inputs of the processing device 109), the processing device 109 may retrieve a concierge number (stored, e.g., in a memory in or otherwise accessible to the processing device 109), in accordance with any of the embodiments discussed above. After retrieving the emergency number (at 1620) or the concierge number (at 1622), the processing device 109 may signal the retrieval of the number to the host 110 at 1624 (e.g., by sending a message to the host 110 using mailbox functionality over an I2C connection between the auxiliary master node 104' and the processing device 109), and then wait for a response from the host 110 at 1626 (e.g., by sending a message to the processing device 109 using mailbox functionality over an I2C connection between the auxiliary master node 104' and the processing device 109). If the host 110 successfully indicates that the call should be initiated, the processing device 109 may place the call to the retrieved number at 1628. The method 1600 also illustrates that, when the processing device 109 is in the wait state 1608, the processing device may receive an instruction from the host 110 to place a call to any specified number (e.g., by sending a message to the processing device 109 using mailbox functionality over an I2C connection between the auxiliary master node 104' and the processing device 109), and the processing device 109 may proceed to place the call at 1628. When the call placed at 1628 ends, the processing device 109 may return to the wait state 1608.

If the host 110 is unresponsive while the processing device 109 is waiting for a response from the host 110 at 1626, or the upstream communication is lost (e.g., via the "config'd as slave" output from the node transceiver 120 received at the "current config" input of the processing device 109) while the processing device 109 is in the wait state 1608 or call state 1628, the processing device 109 may proceed to configure itself as a host device at 1612 and may continue to provide a sustain signal to the power supply 115. The processing device 109 may also proceed to configure itself as a host device at 1612 and output a sustain signal if the processing device 109 determines, after boot-up at 1604, that no voltage bias is present on the upstream link of the two-wire bus 106 coupled to the auxiliary master node 104'. After configuring itself as a host at 1612, the processing device 109 may communicate with the node transceiver 120 to configure the node transceiver 120 as a master device at 1614 (via the "reconfig node transceiver" output of the processing device 109 and the "update config" input of the node transceiver 120). The processing device 109 may then initiate discovery of downstream slave nodes 104 at 1616 (of the auxiliary system 140) in accordance with any of the techniques disclosed herein and then enter a wait state 1618. While in the wait state 1618, if the processing device 109 determines that the upstream bus bias is present, the processing device 109 may proceed to the powered-off/reset state 1602, or may proceed to 1606 to reconfigure itself for slave node operation and may reconfigure the auxiliary master node 104' as a slave (while continuing to output the sustain signal for the power supply 115).

In the wait state 1618, if an emergency signal is received, or if an emergency call ("eCall") button is pressed (e.g., via the CALL inputs of the processing device 109), the processing device 109 may retrieve an emergency number (stored, e.g., in a memory in or otherwise accessible to the processing device 109), in accordance with any of the embodiments discussed above. In the wait state 1618, if a concierge button is pressed, the processing device 109 may retrieve a concierge number (stored, e.g., in a memory in or otherwise accessible to the processing device 109), in accordance with any of the embodiments discussed above. After retrieving the emergency number (at 1630) or the concierge number (at 1632), the processing device 109 may place the call to the retrieved number at 1634. When the call placed at 1634 ends, the processing device 109 may proceed to the powered-off/reset state 1602 and reset. In alternate embodiments, when the call placed at 1634 ends, the processing device 109 may return to the wait state 1618.

In some embodiments, the detection of a bus bias in the wait state 1618 may cause the processing device 109 to proceed to 1606 while continuing to output the sustain signal. In some embodiments, an external event (e.g., actuation of a push button or the absence of a bus bias) may cause the processing device 109 to proceed from the wait state 1618 to 1602 (or any other state). In some embodiments, the processing device 109 may transition directly from 1620 to 1612 and reset, or may reconfigure the auxiliary master node 104' to act as a slave while continuing to output the sustain signal for the power supply 115.

Figure 23:
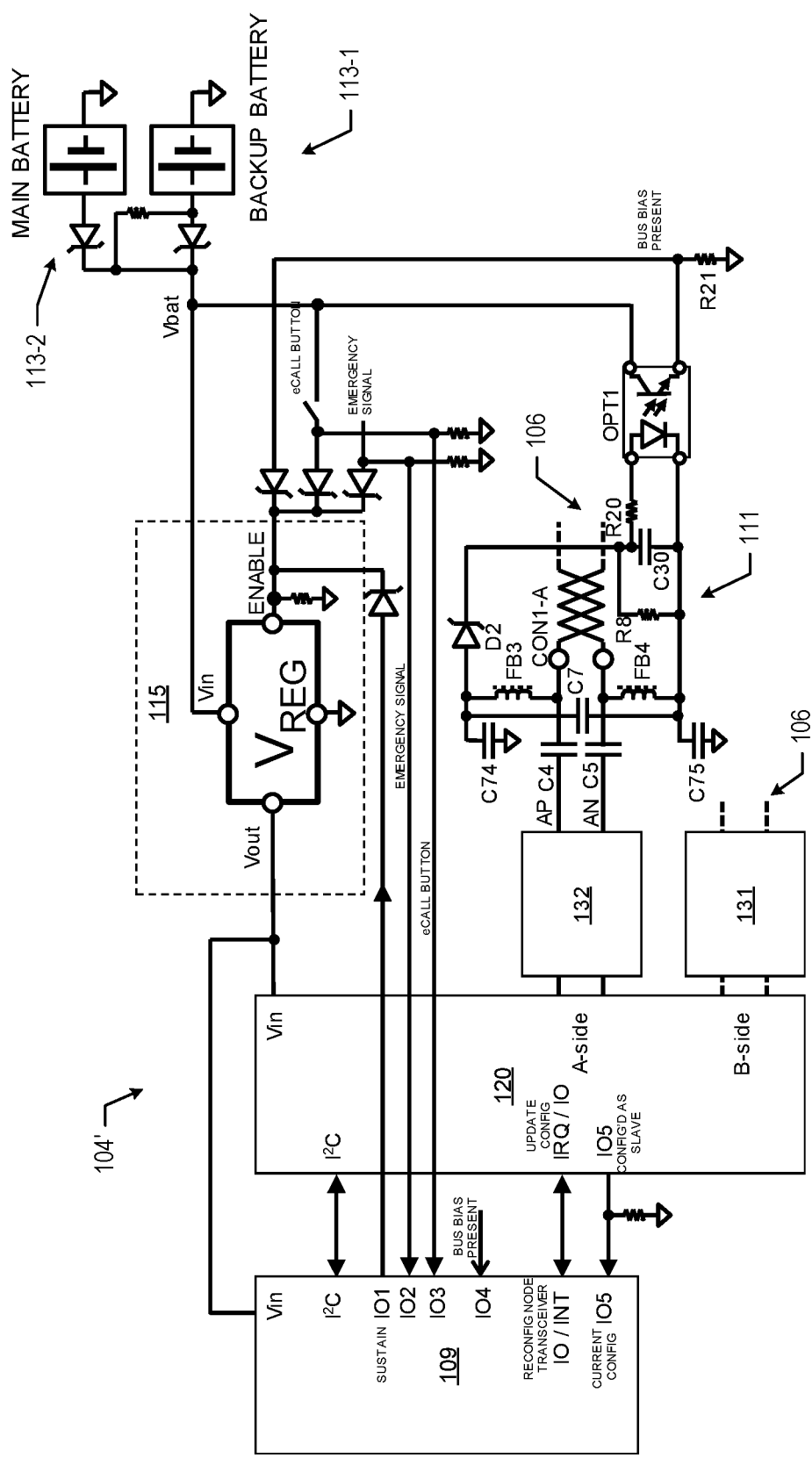
FIG. 23 is a schematic illustration of an example implementation of the portion of the communication system illustrated in FIG. 21, in accordance with various embodiments.

FIG. 23 illustrates a particular embodiment of the portion of the communication system 100 illustrated in FIG. 21. A number of the elements of FIG. 23 are shared with the communication system 100 of FIG. 18; these elements may take any of the forms discussed herein with reference to FIG. 18, and will not be repeated for clarity of discussion. Signal lines for the emergency signal and the eCall button signal are depicted in FIG. 23, but an analogous signal line for a concierge button signal is omitted for ease of illustration. The processing device 109 may set the 101 output high to generate the sustain signal (and set the 101 output low to stop the sustain signal), and the 105 input of the processing device 109 may go high when the node transceiver 120 is configured and discovered as a slave. Changes in the 102 and 103 signals may be translated by the processing device 109 into messages for the host 110 (e.g., interrupts, control messages, GPIO to GPIO signals, etc.).

Figure 24A:
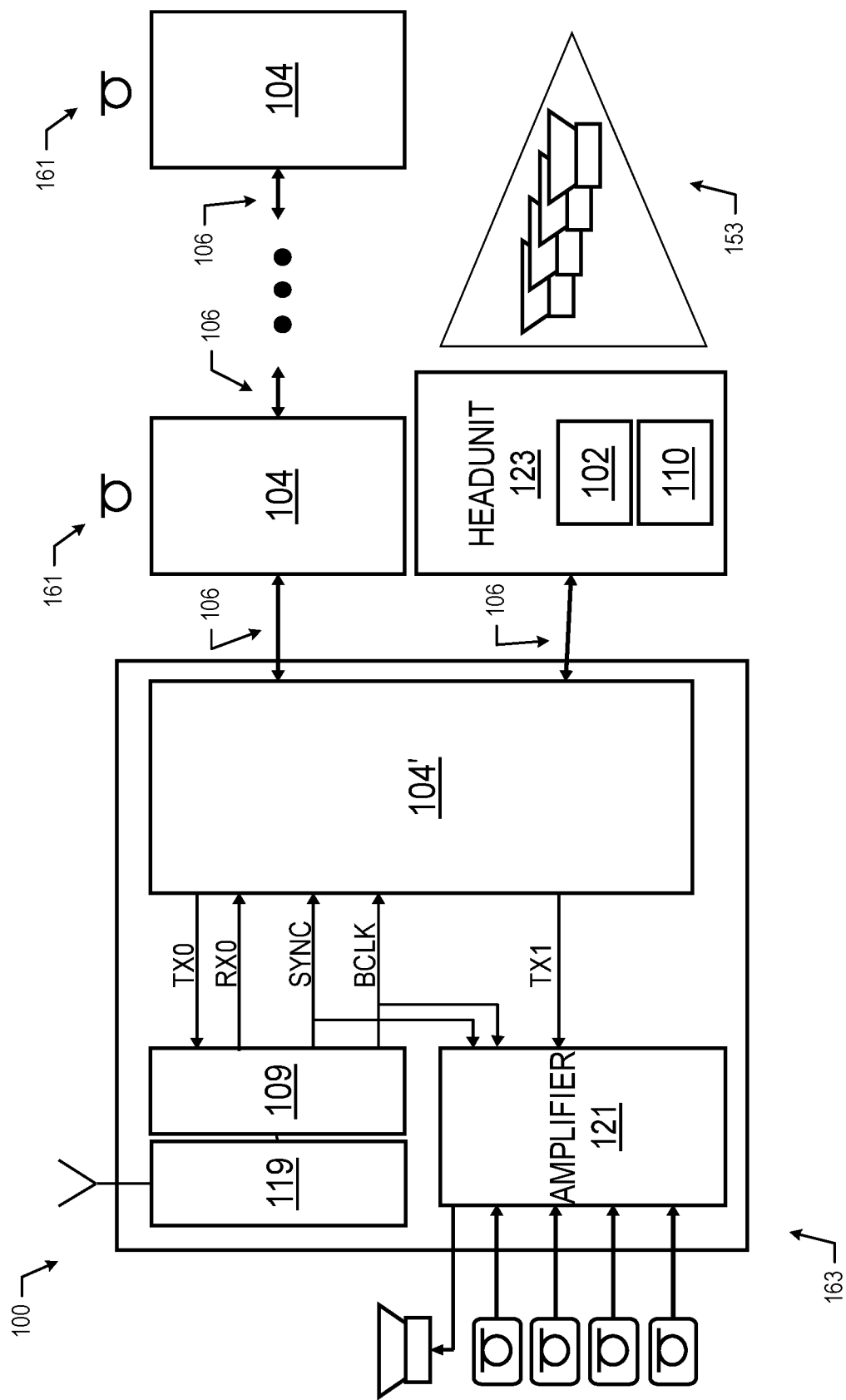
FIGS. 24A and 24B illustrate an example communication system with auxiliary call support functionality under different operating conditions, in accordance with various embodiments.
Figure 24B:
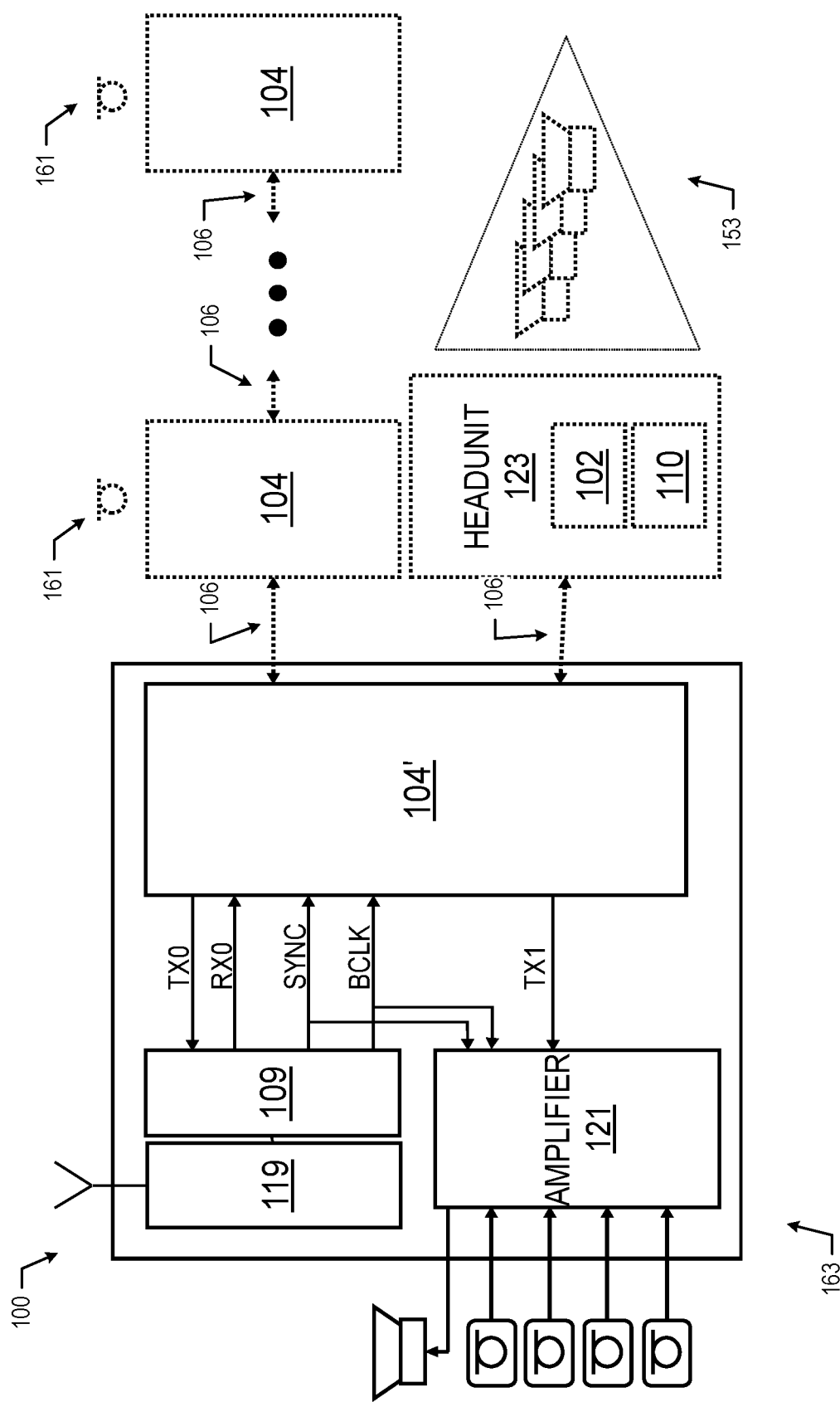

The call hardware 153, and the auxiliary call hardware 163 and 161, may take any of a number of forms. FIG. 24 illustrates one example communication system 100 with auxiliary call support functionality. In particular, FIG. 24A illustrates a communication system 100 under normal conditions (i.e., when the master node 102 is connected) and FIG. 24B illustrates the communication system 100 under auxiliary operating conditions (i.e., when the master node 102 is disconnected). The communication system 100 of FIG. 24 includes a head unit 123 that includes the master node 102 and the host 110 (which may take any of the forms disclosed herein). The head unit 123 may, under normal operation, perform voice processing operations. Call hardware 153 associated with the master node 102/host 110 includes one or more speakers, as shown. The communication system 100 of FIG. 24 also includes an auxiliary master node 104' in communication with a processing device 109 (via an I2S/TDM interface) and in communication with a set of auxiliary call hardware 163 including an amplifier 121 (which may include, for example, one or more ADCs, DACs, codecs, etc.), a modem/antenna 119, one or more speakers, and one or more microphones (e.g., analog or digital microphones), as shown. The communication system 100 of FIG. 24 also includes one or more slave nodes 104 having auxiliary call hardware 161 that includes additional microphones (e.g., analog or digital microphones). Links of the two-wire communication bus 106 may couple the master node 102, the auxiliary master node 104', and the slave nodes 104, as shown.

During the normal operation depicted in FIG. 24A, calls placed in accordance with the methods of FIGS. 20 and 22 may utilize the microphones of the auxiliary call hardware 161, the modem/antenna 119 of the auxiliary call hardware 163, and the speakers of the call hardware 153. During the auxiliary mode of operation depicted in FIG. 24B, calls placed in accordance with the methods of FIGS. 20 and 22 may utilize the modem/antenna 119, speakers, and microphones of the auxiliary call hardware 163. In some embodiments, during the normal mode of operation, calls placed in accordance with the methods of FIGS. 20 and 22 may utilize the microphones and speakers of the auxiliary call hardware 163 and the modem/antenna 119 of the auxiliary call hardware 163, under the control of the head unit 123 (i.e., the host 110 and the master node 102).

Figure 25A:
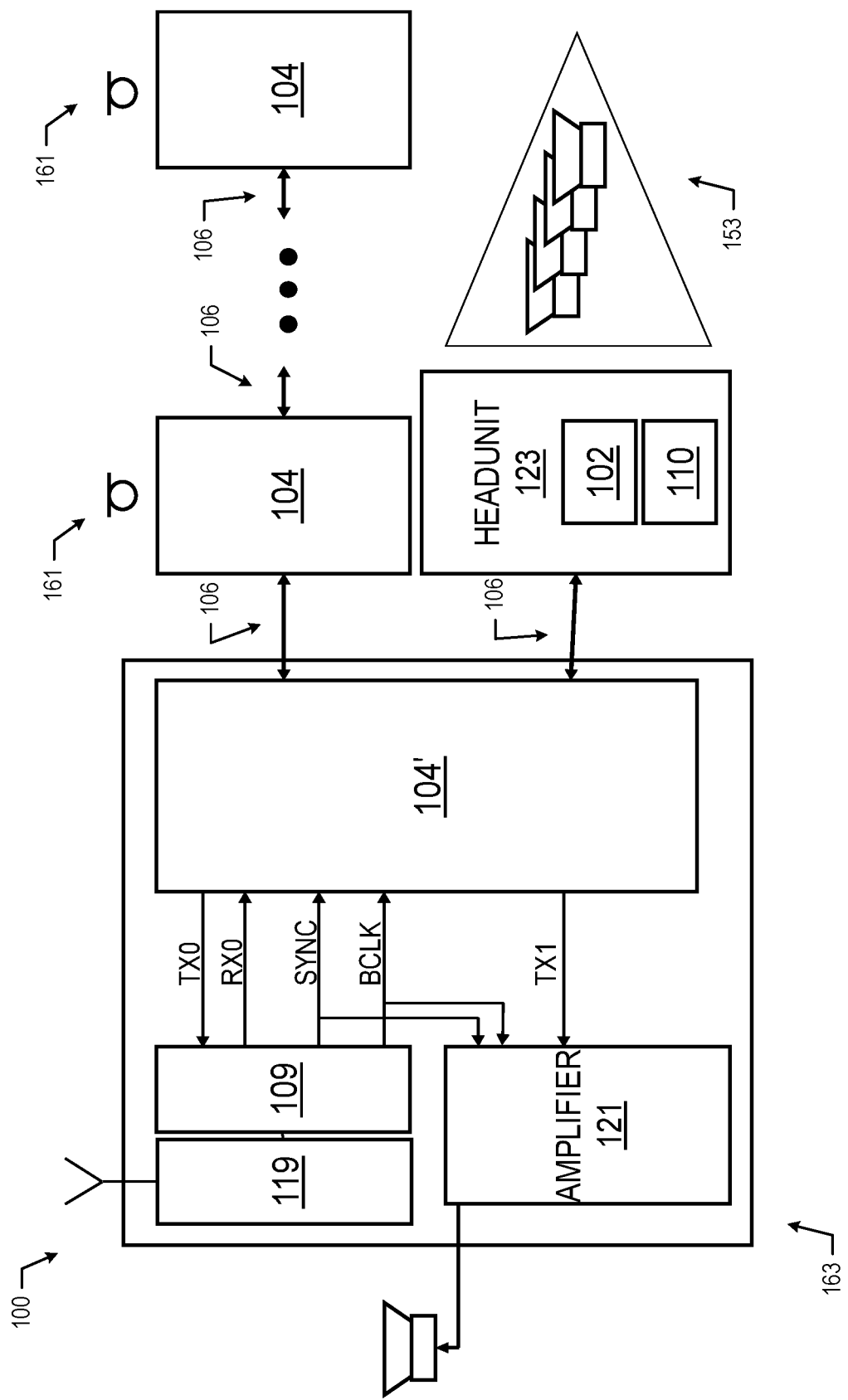
FIGS. 25A and 25B illustrate another example communication system with auxiliary call support functionality under different operating conditions, in accordance with various embodiments.
Figure 25B:
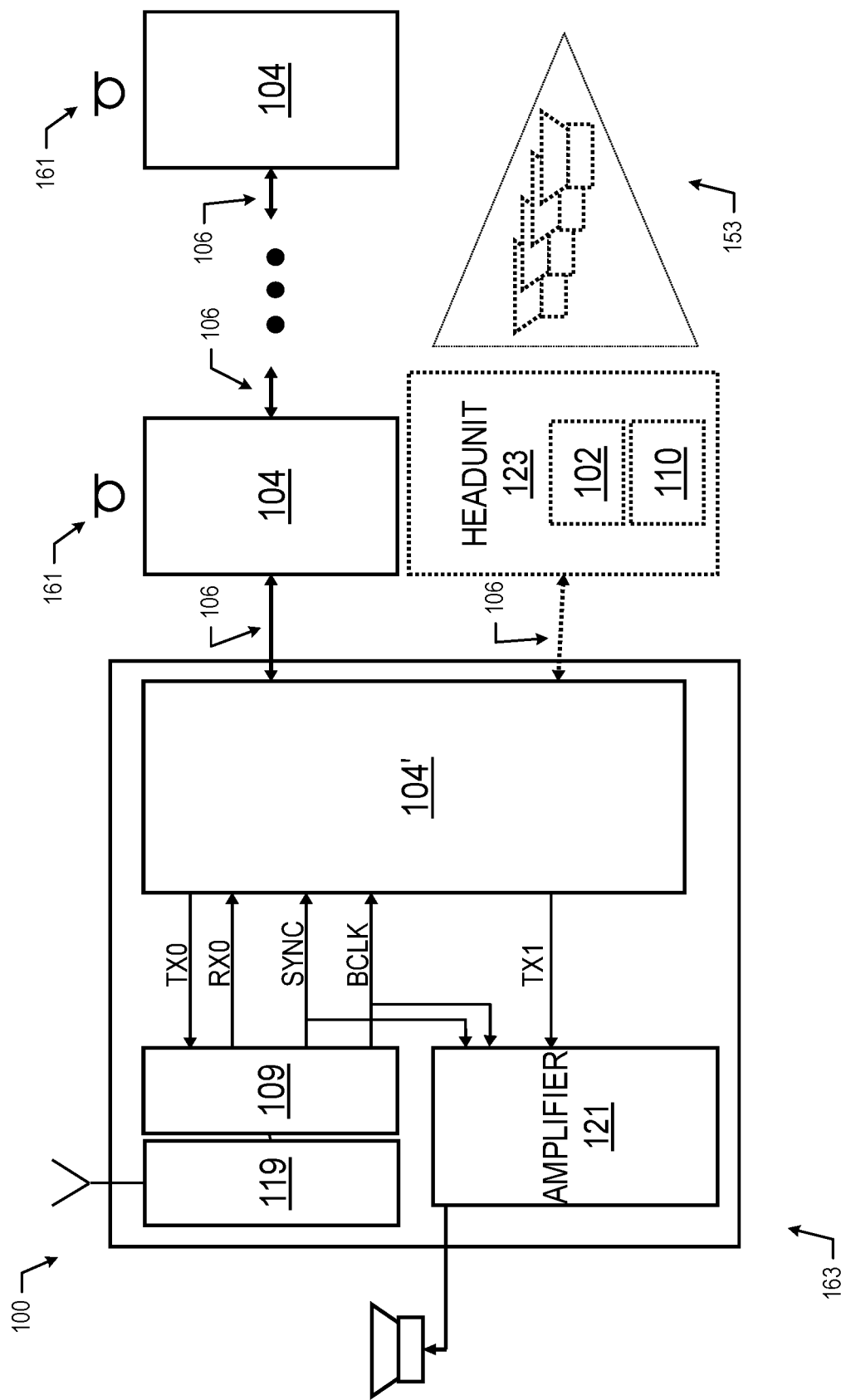

FIG. 25 illustrates another example communication system 100 with auxiliary call support functionality. In particular, FIG. 25A illustrates a communication system 100 under normal conditions (i.e., when the master node 102 is connected) and FIG. 25B illustrates the communication system 100 under auxiliary operating conditions (i.e., when the master node 102 is disconnected). The communication system 100 of FIG. 25 includes a head unit 123 that includes the master node 102 and the host 110 (which may take any of the forms disclosed herein). Call hardware 153 associated with the master node 102/host 110 includes one or more speakers, as shown. The communication system 100 of FIG. 25 also includes an auxiliary master node 104' in communication with a processing device 109 (via an I2S/TDM interface) and in communication with a set of auxiliary call hardware 163 including an amplifier 121, a modem/antenna 119, and one or more speakers, as shown. The communication system 100 of FIG. 25 also includes one or more slave nodes 104 having auxiliary call hardware 161 that includes additional microphones. Links of the two-wire communication bus 106 may couple the master node 102, the auxiliary master node 104', and the slave nodes 104, as shown.

During the normal operation depicted in FIG. 25A, calls placed in accordance with the methods of FIGS. 20 and 22 may utilize the microphones of the auxiliary call hardware 161, the modem/antenna 119 of the auxiliary call hardware 163, and the speakers of the call hardware 153. During the auxiliary mode of operation depicted in FIG. 25B, calls placed in accordance with the methods of FIGS. 20 and 22 may utilize the modem/antenna 119 and speakers of the auxiliary call hardware 163, as well as the microphones of the auxiliary call hardware 161. In some embodiments, during the normal mode of operation, calls placed in accordance with the methods of FIGS. 20 and 22 may utilize the speakers of the auxiliary call hardware 163 and the modem/antenna 119 of the auxiliary call hardware 163, under the control of the head unit 123 (i.e., the host 110 and the master node 102).

The following paragraphs provide examples of various ones of the embodiments disclosed herein.

Example 1 is an apparatus with auxiliary master functionality in a communication system, including: a node transceiver, wherein the node transceiver includes upstream transceiver circuitry to receive a signal transmitted over two upstream wires of a two-wire bus from an upstream master node transceiver and downstream transceiver circuitry to receive a signal transmitted over two downstream wires of the two-wire bus from a downstream slave node transceiver; wherein the node transceiver is to operate as a slave when communication with the master node transceiver is operational, and the node transceiver is (1) to selectively operate as a slave or as a master or (2) to operate as a master when communication with the master node transceiver is not operational or not desired (e.g., when it is preferred that an emergency call never involve the master node transceiver).

Example 2 includes the subject matter of Example 1, and further specifies that the node transceiver is to operate as a slave when the upstream transceiver circuitry receives a voltage bias between the two upstream wires of the two-wire bus, and the node transceiver is to operate as a master when the upstream transceiver circuitry does not receive a voltage bias between the two upstream wires of the two-wire bus.

Example 3 includes the subject matter of Example 1, and further includes: a processing device communicatively coupled to the node transceiver, wherein the processing device is to detect whether communication with the master node transceiver is operational and provide a signal to the node transceiver to cause the node transceiver to operate as a slave or as a master depending on whether communication with the master node transceiver is operational.

Example 4 includes the subject matter of Example 3, and further specifies that the processing device is communicatively coupled to the node transceiver by an Inter-Integrated Circuit Sound (I2S)/Time Division Multiplex (TDM) bus, a Serial Peripheral Interface (SPI) bus, or an Inter-Integrated Circuit (I2C) bus.

Example 5 includes the subject matter of any of Examples 3-4, and further specifies that the processing device is to configure itself as a host for the communication system when communication with the master node transceiver is not operational or not desired.

Example 6 includes the subject matter of any of Examples 3-5, and further specifies that the processing device is further to receive a signal indicative of a wireless communication when communication with the master node transceiver is not operational or not desired, and to initiate the wireless communication in response to the signal.

Example 7 includes the subject matter of Example 6, and further specifies that the signal indicative of a wireless communication is an emergency signal.

Example 8 includes the subject matter of Example 7, and further specifies that the signal indicative of a wireless communication is received via a Controller Area Network (CAN) bus.

Example 9 includes the subject matter of Example 6, and further specifies that the signal indicative of a wireless communication is triggered by a manual call button.

Example 10 includes the subject matter of Example 6, and further specifies that the signal indicative of a wireless communication is triggered by a concierge call button.

Example 11 includes the subject matter of any of Examples 6-10, and further includes: a modem, coupled to the processing device, to place the wireless communication.

Example 12 includes the subject matter of Example 11, and further includes: an antenna coupled to the modem.

Example 13 includes the subject matter of any of Examples 6-12, and further includes: a microphone communicatively coupled to the node transceiver, wherein the wireless communication is a telephone call, and the outgoing data for the telephone call is to be provided by the microphone.

Example 14 includes the subject matter of Example 13, and further specifies that the microphone is communicatively coupled to the node transceiver at least in part by an Inter-Integrated Circuit Sound (I2S)/Time Division Multiplex (TDM) bus or a Pulse Density Modulation (PDM) interface.

Example 15 includes the subject matter of any of Examples 6-14, and further specifies that the node transceiver is a first node transceiver, the first node transceiver includes downstream transceiver circuitry to receive a signal transmitted over two downstream wires of the two-wire bus from a second node transceiver, the wireless communication is a telephone call, and outgoing data for the telephone call is to be provided by a microphone communicatively coupled to the second node transceiver.

Example 16 includes the subject matter of any of Examples 6-15, and further includes: a speaker communicatively coupled to the node transceiver, wherein incoming data for the wireless communication is to be output by the speaker.

Example 17 includes the subject matter of Example 16, and further specifies that the speaker is communicatively coupled to the node transceiver at least in part by an Inter-Integrated Circuit Sound (I2S)/Time Division Multiplex (TDM) bus.

Example 18 includes the subject matter of any of Examples 1-17, and further specifies that the master node transceiver is in a head unit of a vehicle.

Example 19 includes the subject matter of any of Examples 1-18, and further specifies that the master node transceiver is coupled to a host device.

Example 20 includes the subject matter of any of Examples 1-19, and further specifies that the node transceiver is located in a vehicle.

Example 21 is an apparatus with auxiliary master functionality in a communication system, including: a slave node transceiver, wherein the slave node transceiver includes upstream transceiver circuitry to receive a signal transmitted over two upstream wires of a two-wire bus from an upstream master node transceiver, and wherein the master node transceiver is coupled to a host device for the communication system; and a processing device communicatively coupled to the slave node transceiver, wherein the processing device is to detect whether communication between the slave node transceiver and the master node transceiver is operational and, when communication is not operational, cause the slave node transceiver to act as an auxiliary master and cause the processing device to act as an auxiliary host.

Example 22 includes the subject matter of Example 21, and further specifies that the processing device is to detect that communication between the slave node transceiver and the master node transceiver is operational when the upstream transceiver circuitry receives a voltage bias between the two upstream wires of the two-wire bus, and the processing device is to detect that communication between the slave node transceiver and the master node transceiver is not operational when the upstream transceiver circuitry does not receive a voltage bias between the two upstream wires of the two-wire bus.

Example 23 includes the subject matter of any of Examples 21-22, and further specifies that the host device is to make and receive telephone calls using data received and transmitted over the two-wire bus when communication between the slave node transceiver and the master node transceiver is operational, and the auxiliary host is to make and receive telephone calls when communication between the slave node transceiver and the master node transceiver is not operational.

Example 24 includes the subject matter of any of Examples 21-23, and further specifies that the processing device is communicatively coupled to the slave node transceiver by an Inter-Integrated Circuit Sound (I2S)/Time Division Multiplex (TDM) bus.

Example 25 includes the subject matter of any of Examples 21-24, and further specifies that the processing device is to receive a signal indicative of a telephone call when communication between the slave node transceiver and the master node transceiver is not operational, and to initiate the telephone call in response to the signal.

Example 26 includes the subject matter of Example 25, and further specifies that the signal indicative of a telephone call is an emergency signal.

Example 27 includes the subject matter of Example 26, and further specifies that the signal indicative of a telephone call is received via a Controller Area Network (CAN) bus.

Example 28 includes the subject matter of any of Examples 26-27, and further specifies that the signal indicative of a telephone call is triggered by an airbag deployment.

Example 29 includes the subject matter of Example 25, and further specifies that the signal indicative of a telephone call is triggered by a manual call button.

Example 30 includes the subject matter of Example 25, and further specifies that the signal indicative of a telephone call is triggered by a concierge call button.

Example 31 includes the subject matter of any of Examples 25-30, and further includes: a modem, coupled to the processing device, to place the telephone call.

Example 32 includes the subject matter of Example 31, and further includes: an antenna coupled to the modem, wherein the telephone call is a wireless telephone call.

Example 33 includes the subject matter of any of Examples 25-32, and further includes: a microphone communicatively coupled to the slave node transceiver, wherein outgoing data for the telephone call is to be provided by the microphone.

Example 34 includes the subject matter of Example 33, and further specifies that the microphone is communicatively coupled to the slave node transceiver at least in part by an Inter-Integrated Circuit Sound (I2S)/Time Division Multiplex (TDM) bus or a Pulse Density Modulation (PDM) interface.

Example 35 includes the subject matter of any of Examples 25-34, and further specifies that the slave node transceiver is a first slave node transceiver, the first slave node transceiver includes downstream transceiver circuitry to receive a signal transmitted over two downstream wires of the two-wire bus from a second slave node transceiver, and outgoing data for the telephone call is to be provided by a microphone communicatively coupled to the second slave node transceiver.

Example 36 includes the subject matter of any of Examples 25-35, and further includes: a speaker communicatively coupled to the slave node transceiver, wherein incoming data for the telephone call is to be output by the speaker.

Example 37 includes the subject matter of Example 36, and further specifies that the speaker is communicatively coupled to the slave node transceiver at least in part by an Inter-Integrated Circuit Sound (I2S)/Time Division Multiplex (TDM) bus.

Example 38 includes the subject matter of any of Examples 21-37, and further specifies that the master node transceiver is in a head unit of a vehicle.

Example 39 includes the subject matter of any of Examples 21-38, and further specifies that the master node transceiver is coupled to a host device.

Example 40 includes the subject matter of any of Examples 21-39, and further includes: the master node transceiver.

Example 41 includes the subject matter of any of Examples 21-40, and further includes: the host device.

Example 42 is a method of operating as an auxiliary master in a daisy-chained two-wire communication system, including: receiving, by a processing device coupled to a slave node, an indication that a master node of the two-wire communication system has disconnected; and in response to the indication, causing, by the processing device, the slave node to perform master functions for an auxiliary portion of the two-wire communication system.

Example 43 includes the subject matter of Example 42, and further includes: receiving, by the processing device, an indication that the master node has reconnected; and in response to the indication that the master node has reconnected, causing, by the processing device, the slave node to cease performance of master functions.

Example 44 includes the subject matter of any of Examples 42-43, and further specifies that the indication that the master node has disconnected includes detection of no voltage bias on a portion of the two-wire communication system between the master node and the slave node.

Example 45 includes the subject matter of any of Examples 42-44, and further includes: in response to the indication, causing, by the processing device, the processing device to perform host functions for the auxiliary portion of the two-wire communication system.

Example 46 includes the subject matter of any of Examples 42-45, and further includes: after causing the slave node to perform master functions, receiving, by the processing device, a signal indicative of a wireless communication to be initiated; and causing, by the processing device, the wireless communication to be initiated.

Example 47 includes the subject matter of Example 46, and further specifies that the signal includes an emergency signal, an actuation of a manual call button, or an actuation of a concierge button.

Example 48 is a communication system with auxiliary master functionality, including a master node coupled to a plurality of downstream slave nodes, wherein at least one of the slave nodes may perform master node functions when the master node is disconnected from the communication system.

Example 49 includes the subject matter of Example 48, and further specifies that a processing device coupled to at least one of the slave nodes is to perform discovery of the at least one of the slave nodes when the master node is disconnected from the communication system.

Example 50 includes the subject matter of any of Examples 48-49, and further specifies that the at least one of the slave nodes is to cease performing master node functions when the master node is reconnected to the communication system.

Example 51 is a communication system with auxiliary master functionality, in accordance with any of the embodiments disclosed herein.

Example 52 is a communication system with auxiliary call support functionality, in accordance with any of the embodiments disclosed herein.

Example 53 is a method of using a slave node as an auxiliary master in a communication system, in accordance with any of the embodiments disclosed herein.

Example 54 is a communication system including means for auxiliary master functionality, in accordance with any of the embodiments disclosed herein.

Example 55 is a communication system including means for performing any of the methods disclosed herein.

The invention claimed is:

1. An apparatus with auxiliary master functionality in a communication system, comprising:
a node transceiver, wherein the node transceiver includes upstream transceiver circuitry to receive a signal transmitted over two upstream wires of a two-wire bus from an upstream master node transceiver and downstream transceiver circuitry to receive a signal transmitted over two downstream wires of the two-wire bus from a downstream slave node transceiver, wherein the node transceiver is to selectively operate as a slave or a master; and
a processing device communicatively coupled to the node transceiver, wherein the processing device is to provide a signal to the node transceiver to cause the node transceiver to operate as a slave or as a master, and the processing device is to configure itself as a host for the communication system when the node transceiver operates as a master.

2. The apparatus of claim 1, wherein the node transceiver is to operate as a slave when communication with the master node transceiver is operational, and the node transceiver is to operate as a master when communication with the master node transceiver is not operational.

3. The apparatus of claim 1, wherein the node transceiver is to operate as a slave when the upstream transceiver circuitry receives a voltage bias between the two upstream wires of the two-wire bus, and the node transceiver is to operate as a master when the upstream transceiver circuitry does not receive a voltage bias between the two upstream wires of the two-wire bus.

4. The apparatus of claim 1, wherein the processing device is to detect whether communication with the master node transceiver is operational and provide a signal to the node transceiver to operate as a slave or as a master depending on whether communication with the master node transceiver is operational.

5. The apparatus of claim 1, wherein the processing device is further to receive a signal indicative of a wireless communication when the node transceiver operates as a master, and to initiate the wireless communication in response to the signal.

6. The apparatus of claim 5, wherein the signal indicative of a wireless communication is an emergency signal, or the signal indicative of a wireless communication is triggered by a manual call button or a concierge call button.

7. An apparatus with auxiliary master functionality in a communication system, comprising:
a slave node transceiver, wherein the slave node transceiver includes upstream transceiver circuitry to receive a signal transmitted over two upstream wires of a two-wire bus from an upstream master node transceiver, and wherein the master node transceiver is coupled to a host device for the communication system; and a processing device communicatively coupled to the slave node transceiver, wherein the processing device is to detect whether communication between the slave node transceiver and the master node transceiver is operational and, when communication is not operational, cause the slave node transceiver to act as an auxiliary master and cause the processing device to act as an auxiliary host.

8. The apparatus of claim 7, wherein the processing device is to receive a signal indicative of a telephone call when communication between the slave node transceiver and the master node transceiver is not operational, and to initiate the telephone call in response to the signal.

9. The apparatus of claim 8, further comprising:

a microphone communicatively coupled to the slave node transceiver, wherein outgoing data for the telephone call is to be provided by the microphone.

10. The apparatus of claim 8, wherein the slave node transceiver is a first slave node transceiver, the first slave node transceiver includes downstream transceiver circuitry to receive a signal transmitted over two downstream wires of the two-wire bus from a second slave node transceiver, and outgoing data for the telephone call is to be provided by a microphone communicatively coupled to the second slave node transceiver.

11. The apparatus of claim 8, further comprising:

a speaker communicatively coupled to the slave node transceiver, wherein incoming data for the telephone call is to be output by the speaker.

12. The apparatus of claim 7, wherein the master node transceiver is in a head unit of a vehicle.

13. The apparatus of claim 7, wherein the master node transceiver is coupled to a host device.

14. The apparatus of claim 7, wherein the apparatus further includes the master node transceiver or the host device.

15. A method of operating as an auxiliary master in a daisy-chained two-wire communication system, comprising:

receiving, by a processing device coupled to a slave node, an indication that a master node of the daisy-chained two-wire communication system has disconnected;

in response to the indication, causing, by the processing device, the slave node to perform master functions for an auxiliary portion of the daisy-chained two-wire communication system; and in response to the indication, causing, by the processing device, the processing device to perform host functions for the auxiliary portion of the two-wire communication system.

16. The method of claim 15, further comprising:

receiving, by the processing device, an indication that the master node has reconnected; and in response to the indication that the master node has reconnected, causing, by the processing device, the slave node to cease performance of master functions.

17. The method of claim 15, further comprising:

after causing the slave node to perform master functions, receiving, by the processing device, a signal indicative of a wireless communication to be initiated; and causing, by the processing device, the wireless communication to be initiated.

18. The apparatus of claim 1, wherein the processing device is to receive a signal indicative of a telephone call when the node transceiver operates as a master, and is to initiate the telephone call in response to the signal.

19. The apparatus of claim 18, further comprising:

a microphone communicatively coupled to the node transceiver, wherein outgoing data for the telephone call is to be provided by the microphone.

20. The apparatus of claim 18, further comprising:

a speaker communicatively coupled to the node transceiver, wherein incoming data for the telephone call is to be output by the speaker.

* * * * *